(12) United States Patent
Koike et al.

(10) Patent No.: US 10,592,958 B2
(45) Date of Patent: Mar. 17, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Hiroyuki Koike, Kanagawa (JP); Tomoharu Ohsumi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/394,378

(22) Filed: Dec. 29, 2016

(65) Prior Publication Data

US 2017/0109809 A1    Apr. 20, 2017

Related U.S. Application Data

(63) Continuation of application No. 14/456,591, filed on Aug. 11, 2014, now Pat. No. 9,558,243, which is a (Continued)

(30) Foreign Application Priority Data

Jan. 7, 2005  (JP) ................................. 2005-002088

(51) Int. Cl.
*G06F 16/20* (2019.01)
*G06Q 30/06* (2012.01)
(Continued)

(52) U.S. Cl.
CPC ... *G06Q 30/0631* (2013.01); *G06F 16/24578* (2019.01); *G06F 16/334* (2019.01); *G06F 16/338* (2019.01); *G06Q 30/02* (2013.01)

(58) Field of Classification Search
None
See application file for complete search history.

(56) References Cited

U.S. PATENT DOCUMENTS 6,370,513 B1 * 4/2002 Kolawa ................. G06Q 30/02
                                                     705/15
2003/0177110 A1   9/2003 Okamoto et al.
(Continued)

FOREIGN PATENT DOCUMENTS

JP       2002-142160        5/2002
JP       2003-186907        7/2003
(Continued)

*Primary Examiner* — Belix M Ortiz Ditren
(74) *Attorney, Agent, or Firm* — Oblon, McClelland, Maier & Neustadt, L.L.P.

(57) ABSTRACT

An information processing method is disclosed which includes the steps of: (a) calculating levels of similarity between a standard form vector as a comparison basis vector and each of a plurality of item characteristic vectors of the standard form which are characteristic of a plurality of items, the standard form vector being made up of N components individually representative of N attributes of each of the plurality of items, N being an integer of at least 1, step (a) further determining as the items to be recommended to a user a plurality of items corresponding to the item characteristic vectors of which the level of similarity satisfies a first condition; (b) determining one of the N attributes of the plurality of recommended items determined in step (a) as a common recommendation reason common to the plurality of recommended items when the determined attribute satisfies a second condition; and (c) controlling presentation to the user of either the plurality of recommended items determined in step (a) or information about the recommended items, together with the common recommendation reason determined in step (b).

14 Claims, 14 Drawing Sheets

Related U.S. Application Data continuation of application No. 11/324,272, filed on Jan. 4, 2006, now Pat. No. 8,805,851.

(51) Int. Cl.
    *G06F 16/33*     (2019.01)
    *G06F 16/338*     (2019.01)
    *G06F 16/2457*     (2019.01)
    *G06Q 30/02*     (2012.01)

(56) References Cited

U.S. PATENT DOCUMENTS

| | | | |
|---|---|---|---|
| 2005/0049917 A1* | 3/2005 | Fink | G06Q 30/02 |
| | | | 705/14.58 |
| 2005/0165782 A1* | 7/2005 | Yamamoto | G06F 17/30017 |
| 2008/0147650 A1* | 6/2008 | Marsh | G06F 17/30038 |

FOREIGN PATENT DOCUMENTS

| | | |
|---|---|---|
| JP | 2003-233622 | 8/2003 |
| JP | 2003-271640 | 9/2003 |
| JP | 2004-194107 | 7/2004 |
| JP | 2004-355340 | 12/2004 |

\* cited by examiner

FIG.2

WELCOME TO THE WINE RECOMMENDING SERVICE

THE FOLLOWING WINES ARE RECOMMENDED TO
YOU FAVORING WINES WITH A ROBUST AROMA:

1. CHATEAU ○○○ ★★★★★
2. CHATEAU ×××  ★★★☆☆
3. ...

WELCOME TO THE WINE RECOMMENDING SERVICE

THE FOLLOWING WINES ARE RECOMMENDED TO
YOU FAVORING WINES WITH A ROBUST AROMA:

1. CHATEAU ○○○ ★★★★★
2. CHATEAU ×××  ★★★☆☆
3. △△(DOMAINE ??) ★★☆☆☆
   [WITH A TWIST IN TASTE]

| ITEM | LEVEL OF SIMILARITY |
|---|---|
| FIRST ITEM | 0.8 |
| SECOND ITEM | 0.3 |
| THIRD ITEM | 0.9 |
| FOURTH ITEM | 0.4 |
| FIFTH ITEM | 0.7 |
| ⋮ | ⋮ |
| n-TH ITEM | 0.2 |

FIG.8

| RECOMMENDATION LIST | |
|---|---|
| ITEM | LEVEL OF SIMILARITY |
| FIRST ITEM | 0.8 |
| THIRD ITEM | 0.9 |
| FIFTH ITEM | 0.7 |

| APPELLATION | CHARACTERISTIC VECTOR/USER PREFERENCE VECTOR | | | | | |
|---|---|---|---|---|---|---|
| | NUMERIC ATTRIBUTE | APPELLATION ATTRIBUTE | | | | |
| | AROMA | COLOR | | VARIETY | | |
| | | RED | WHITE | VARIETY A | VARIETY B | |
| USER | 2.5 | 0 | 1 | 0.5 | 0.7 | |
| FIRST ITEM | 1.0 | 0 | 1 | 2.1 | 1.0 | |
| THIRD ITEM | 2.0 | 1 | 0 | 3.0 | 2.0 | |
| FIFTH ITEM | 3.0 | 1 | 0 | 1.5 | 0.5 | |

FIG. 11

| ITEM NAME | RECOMMENDATION REASON LIST | | | | | | |
|---|---|---|---|---|---|---|---|
| | NUMERIC ATTRIBUTE | | | APPELLATION ATTRIBUTE | | | |
| | AROMA | | | COLOR | | VARIETY | |
| | 1 | 2 | 3 | RED | WHITE | VARIETY A | VARIETY B |
| FIRST ITEM | | | | | 1 | 0.7 | |
| THIRD ITEM | 0.5 | 1.0 | 0.5 | | | 1.0 | 0.93 |
| FIFTH ITEM | 0 | 0.5 | 1 | | | | |

FIG. 15

| | EFFECTIVENESS |
|---|---|
| FIRST ITEM | 1.0 |
| THIRD ITEM | 2.5 |
| FIFTH ITEM | 0.5 |

START PROCESS OF PRESENTING COMMON REASON FOR RECOMMENDATION

S51 BASED ON USER'S HISTORY OR OTHER SUITABLE INFORMATION, ESTABLISH ATTRIBUTE DEEMED IMPORTANT BY USER AS THEME FOR ALL RECOMMENDED ITEMS (COMMON RECOMMENDATION REASON)

S52 FROM ITEM CHARACTERISTIC VECTORS OF EACH ITEM, ACQUIRE AT LEAST ONE ITEM CHARACTERISTIC VECTOR WHOSE ATTRIBUTE ESTABLISHED AS THEME FOR ALL ITEMS (COMMON RECOMMENDATION REASON) HAS A COMPONENT VALUE SATISFYING PREDETERMINED CONDITION

S53 FIND SIMILARITY BETWEEN USER PREFERENCE VECTOR AND AT LEAST ONE ITEM CHARACTERISTIC VECTOR ACQUIRED, AND DETERMINE AS RECOMMENDED ITEM EACH ITEM CORRESPONDING TO ITEM CHARACTERISTIC VECTOR WHOSE LEVEL OF SIMILARITY SATISFIES PREDETERMINED CONDITION

S54 PRESENT USER WITH RECOMMENDED ITEMS TOGETHER WITH THEME FOR ALL RECOMMENDED ITEMS (COMMON RECOMMENDATION REASON)

END

INFORMATION PROCESSING APPARATUS, INFORMATION PROCESSING METHOD, AND PROGRAM

CROSS REFERENCES TO RELATED APPLICATIONS

This application is a continuation of U.S. application Ser. No. 14/456,591 filed Aug. 11, 2014, which is a continuation of U.S. application Ser. No. 11/324,272 filed Jan. 4, 2006, and is based upon and contains the subject matter related to Japanese Patent Application JP 2005-002088 filed with the Japanese Patent Office on Jan. 7, 2005, the entire contents of which being incorporated herein by reference.

BACKGROUND OF THE INVENTION

The present invention relates to an information processing apparatus, an information processing method, and a program. More particularly, the invention relates to an information processing apparatus, an information processing method, and a program for presenting users with recommended items together with convincing reasons for the recommendation.

Systems for recommending items to users (simply called the recommendation system hereunder) have gained widespread use as one variation of information processing systems in recent years (e.g., see Japanese Patent Laid-Open No. 2004-194107). An item refers illustratively to a product, commodity, etc., that may be purchased by users. In the above-cited patent document, items are referred to as content. The items will be discussed later in detail.

Some of the recommendation systems proposed so far are know to present users with recommended items along with reasons for the recommendation.

SUMMARY OF THE INVENTION

Such traditional recommendation systems including the one disclosed in the above-cited application have one disadvantage in common: they have had difficulty in presenting the user with convincing reasons for recommendation. In other words, there exist quite a few users who find it incomprehensible why such and such items are presented as something recommendable by the system.

The present invention has been made in view of the above circumstances and provides arrangements which, when presenting the user with recommended items, can present at the same time convincing reasons for the recommendation.

According to one embodiment of the present invention, there is provided a first information processing apparatus including: recommending means for calculating levels of similarity between a standard form vector as a comparison basis vector and each of a plurality of item characteristic vectors of the standard form which are characteristic of a plurality of items, the standard form vector being made up of N components individually representative of N attributes of each of the plurality of items, N being an integer of at least 1, the recommending means further determining as the items to be recommended to a user a plurality of items corresponding to the item characteristic vectors of which the level of similarity satisfies a first condition; common recommendation reason determining means for determining one of the N attributes of the plurality of recommended items determined by the recommending means as a common recommendation reason when the determined attribute satisfies a second condition, the common recommendation reason being common to the plurality of recommended items; and presenting means for presenting the user with either the plurality of recommended items determined by the recommending means or information about the recommended items, together with the common recommendation reason determined by the common recommendation reason determining means.

One preferred structure of the first information processing apparatus according to the invention may further include item-specific recommendation reason determining means which establishes successively each of the plurality of recommended items determined by the recommending means as the item of interest, performs a first calculation on each of the N components of the item characteristic vector for the item of interest by use of a component value corresponding to each of the N components as well as the corresponding component value constituting part of the comparison basis vector, determines the value resulting from the first calculation as a recommendation reason level of the attribute corresponding to the component being dealt with, and determines as an item-specific recommendation reason the attribute of which the recommendation reason level satisfies a third condition; wherein the common recommendation reason determining means may establish successively each of the N attributes as the attribute of interest, perform a second calculation using each of the recommendation reason levels determined by the item-specific recommendation reason determining means about the attribute of interest for each of the plurality of recommended items, and determine the attribute of interest as the common recommendation reason common to the plurality of recommended items if the value resulting from the second calculation satisfies the second condition.

According to another embodiment of the present invention, there is provided a first information processing method including the steps of: (a) calculating levels of similarity between a standard form vector as a comparison basis vector and each of a plurality of item characteristic vectors of the standard form which are characteristic of a plurality of items, the standard form vector being made up of N components individually representative of N attributes of each of the plurality of items, N being an integer of at least 1, step (a) further determining as the items to be recommended to a user a plurality of items corresponding to the item characteristic vectors of which the level of similarity satisfies a first condition; (b) determining one of the N attributes of the plurality of recommended items determined in step (a) as a common recommendation reason common to the plurality of recommended items when the determined attribute satisfies a second condition; and (c) controlling presentation to the user of either the plurality of recommended items determined in step (a) or information about the recommended items, together with the common recommendation reason determined in step (b).

According to a further embodiment of the present invention, there is provided a first program for causing a computer to carry out a procedure including the steps of: (a) calculating levels of similarity between a standard form vector as a comparison basis vector and each of a plurality of item characteristic vectors of the standard form which are characteristic of a plurality of items, the standard form vector being made up of N components individually representative of N attributes of each of the plurality of items, N being an integer of at least 1, step (a) further determining as the items to be recommended to a user a plurality of items corresponding to the item characteristic vectors of which the level of similarity satisfies a first condition; (b) determining one of the N attributes of the plurality of recommended items determined in step (a) as a common recommendation reason common to the plurality of recommended items when the determined attribute satisfies a second condition; and (c) controlling presentation to the user of either the plurality of recommended items determined in step (a) or information about the recommended items, together with the common recommendation reason determined in step (b).

Where the above-outlined first information processing apparatus, first information processing method, and first program of the present invention are in use, levels of similarity are first calculated between a standard form vector as a comparison basis vector and each of a plurality of item characteristic vectors of the standard form which are characteristic of a plurality of items. The standard form vector is made up of N components individually representative of N attributes of each of the plurality of items, N being an integer of at least 1. A plurality of items corresponding to the item characteristic vectors of which the level of similarity satisfies a first condition are determined as the items to be recommended to a user. One of the N attributes of the plurality of recommended items determined above is determined as a common recommendation reason common to the plurality of recommended items when the determined attribute satisfies a second condition. The user is then presented with either the plurality of recommended items determined above or information about the recommended items together with the above-determined common recommendation reason.

According to an even further embodiment of the present invention, there is provided a second information processing apparatus including: common recommendation reason determining means for determining in advance one of N attributes of items as a common recommendation reason common to a plurality of items to be recommended to a user when the determined attribute satisfies a first condition, N being an integer of at least 1; recommending means which, from among a plurality of item characteristic vectors of a standard form which are characteristic of a plurality of items, the standard form being a vector of which N components individually represent the N attributes, selects at least one item characteristic vector of which the component corresponding to the attribute determined as the common recommendation reason by the common recommendation reason determining means satisfies a second condition, the recommending means further calculating levels of similarity between a comparison basis vector of the standard form and each of at least one item characteristic vector selected in order to determine, as the items to be recommended to a user, a plurality of items corresponding to the item characteristic vectors of which the level of similarity satisfies a third condition; and presenting means for presenting the user with either the plurality of recommended items determined by the recommending means or information about the recommended items, together with the common recommendation reason determined by the common recommendation reason determining device.

According to a still further embodiment of the present invention, there is provided a second information processing method including the steps of: (a) determining in advance one of N attributes of items as a common recommendation reason common to a plurality of items to be recommended to a user when the determined attribute satisfies a first condition, N being an integer of at least 1; (b) from among a plurality of item characteristic vectors of a standard form which are characteristic of a plurality of items, the standard form being a vector of which N components individually represent the N attributes, selecting at least one item characteristic vector of which the component corresponding to the attribute determined as the common recommendation reason in step (a) satisfies a second condition, step (b) further calculating levels of similarity between a comparison basis vector of the standard form and each of at least one item characteristic vector selected in order to determine, as the items to be recommended to a user, a plurality of items corresponding to the item characteristic vectors of which the level of similarity satisfies a third condition; and (c) controlling presentation to the user of either the plurality of recommended items determined in step (b) or information about the recommended items, together with the common recommendation reason determined in step (a).

According to a yet further embodiment of the present invention, there is provided a second program for causing a computer to carry out a procedure including the steps of: (a) determining in advance one of N attributes of items as a common recommendation reason common to a plurality of items to be recommended to a user when the determined attribute satisfies a first condition, N being an integer of at least 1; (b) from among a plurality of item characteristic vectors of a standard form which are characteristic of a plurality of items, the standard form being a vector of which N components individually represent the N attributes, selecting at least one item characteristic vector of which the component corresponding to the attribute determined as the common recommendation reason in step (a) satisfies a second condition, step (b) further calculating levels of similarity between a comparison basis vector of the standard form and each of at least one item characteristic vector selected in order to determine, as the items to be recommended to a user, a plurality of items corresponding to the item characteristic vectors of which the level of similarity satisfies a third condition; and (c) controlling presentation to the user of either the plurality of recommended items determined in step (b) or information about the recommended items, together with the common recommendation reason determined in step (a).

Where the above-outlined second information processing apparatus, second information processing method, and second program of the present invention are in use, one of N attributes of items is determined in advance as a common recommendation reason common to a plurality of items to be recommended to a user when the determined attribute satisfies a first condition, N being an integer of at least 1. From among a plurality of item characteristic vectors of a standard form which are characteristic of a plurality of items (the standard form is a vector of which N components individually represent the N attributes), at least one item characteristic vector is selected when the component thereof corresponding to the attribute determined above as the common recommendation reason satisfies a second condition. Levels of similarity are then calculated between a comparison basis vector of the standard form and each of at least one item characteristic vector selected in order to determine, as the items to be recommended to a user, a plurality of items corresponding to the item characteristic vectors of which the level of similarity satisfies a third condition. The user is then presented with either the plurality of recommended items determined above or information about the recommended items together with the above-determined common recommendation reason.

As outlined above, the presently preferred embodiments of the present invention are capable of presenting the user with recommended items together with reasons for the recommendation. What is noteworthy is that each user is presented with a convincing reason for the items that have been presented to that user.

BRIEF DESCRIPTION OF THE DRAWINGS

Further objects and advantages of the present invention will become apparent upon a reading of the following description and appended drawings in which:

FIG. 2 is a schematic view showing a typical image presented to the user by the information processing apparatus of FIG. 1;

FIG. 3 is a schematic view showing another typical image presented to the user by the information processing apparatus of FIG. 1a;

FIG. 7 is a tabular view listing levels of similarity between candidates of recommended items determined in step S1 of FIG. 6 on the one hand, and a user preference vector on the other hand;

FIG. 8 is a typical recommendation list generated in step S1 of FIG. 6;

FIG. 10 is a tabular view showing examples of a user preference vector and an item characteristic vector corresponding respectively to the user and each item handled in the process of FIG. 9;

FIG. 11 is a tabular view showing a typical recommendation reason list generated as a result of the process of FIG. 9 using the user preference vector and item characteristic vector given in FIG. 10;

FIG. 15 is a tabular view showing effective vectors as typical information for determining a common recommendation reason where a common recommendation reason determining technique different from the one applied to the example of FIG. 12 or FIG. 14 is adopted;

FIG. 16 is a flowchart of detailed steps constituting the process of calculating a common recommendation reason level, the process being carried out in step S3 of FIG. 6 as part of the common recommendation reason presenting process but being different from the example of FIG. 12.

DETAILED DESCRIPTION OF THE PREFERRED EMBODIMENTS

What is described below as the preferred embodiments of the present invention corresponds to the appended claims as follows, the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of the present invention but which may be added or brought about by this applicant in the future by divisional application or by amendment.

Figure 1:
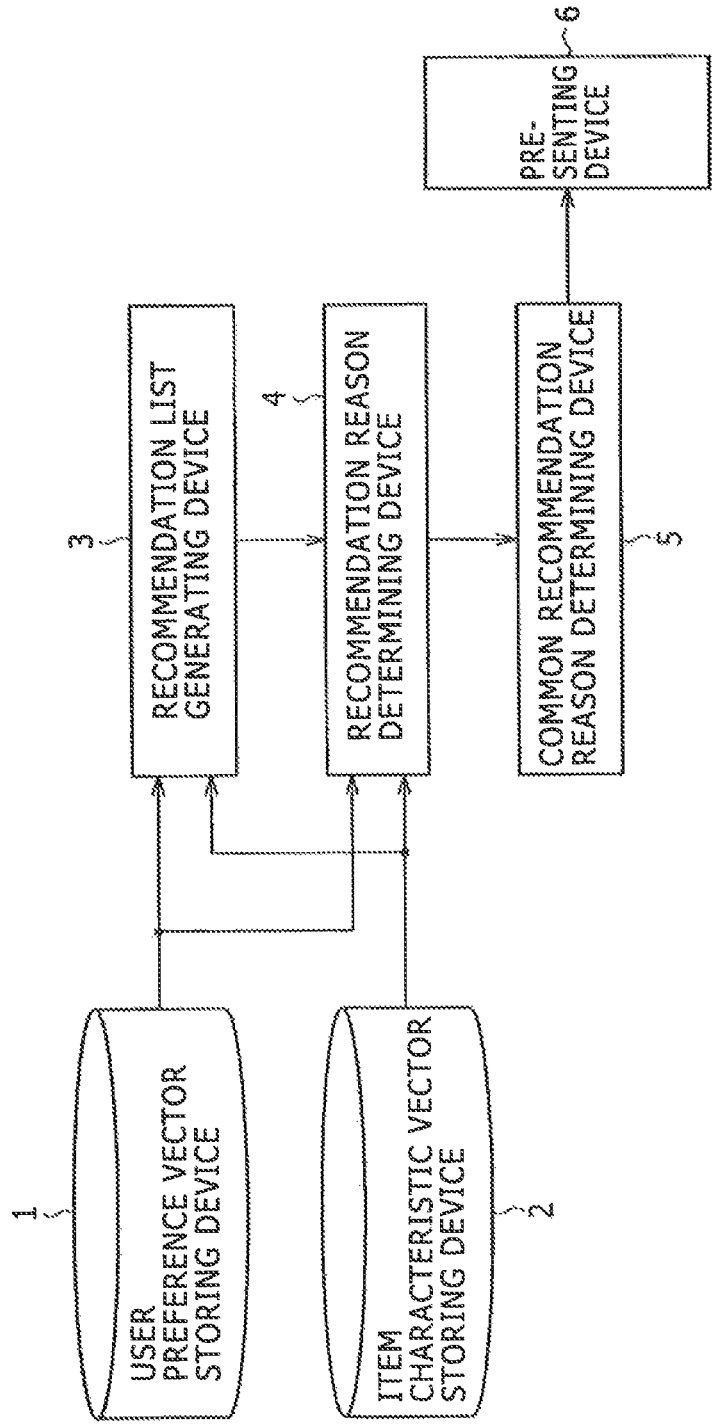
FIG. 1 is a block diagram showing a typical functional structure of an information processing system or apparatus to which the present invention is applied.

The present invention provides, as outlined above, the first information processing apparatus (e.g., information processing apparatus in FIG. 1) including: a recommending device (e.g., recommendation list generating device 3 in FIG. 1 for carrying out step S1 of FIG. 6) calculating levels of similarity between a standard form vector (e.g., vector such as aroma, color (red, white), and variety (A, B) in FIG. 10 where items are wines) as a comparison basis vector (e.g., user preference vector stored in a user preference vector storing device 1 in FIG. 1; more specifically, the vector on row 1 in FIG. 10 shown as "user") and each of a plurality of item characteristic vectors (e.g., item characteristic vectors stored in an item characteristic vector storing device 2 in FIG. 1; more specifically, the item characteristic vectors on lines 2 through 4 in FIG. 10 shown as "first item," "third item" and "fifth item") of the standard form which are characteristic of a plurality of items, the standard form vector being made up of N components individually representative of N attributes of each of the plurality of items, N being an integer of at least 1, the recommending device further determining as the items to be recommended to a user a plurality of items corresponding to the item characteristic vectors of which the level of similarity satisfies a first condition; a common recommendation reason determining device (e.g., common recommendation reason determining device 5 in FIG. 1 to which are applied diverse techniques corresponding to the common recommendation reason presenting process in step S3 of FIG. 6) determining one of the N attributes of the plurality of recommended items determined by the recommending device as a common recommendation reason when the determined attribute satisfies a second condition, the common recommendation reason being common to the plurality of recommended items; and a presenting device (e.g., presenting device 6 in FIG. 1 for carrying out steps S4 of FIG. 6) presenting the user with either the plurality of recommended items determined by the recommending device or information about the recommended items (e.g., appellations such as "Chateau - - -" and "Chateau xxx" in the image 11 of FIG. 2 where items are wines), together with the common recommendation reason (e.g., "wines with a robust aroma" in the image 11 of FIG. 2 where items are wines) determined by the common recommendation reason determining device.

Figure 12:
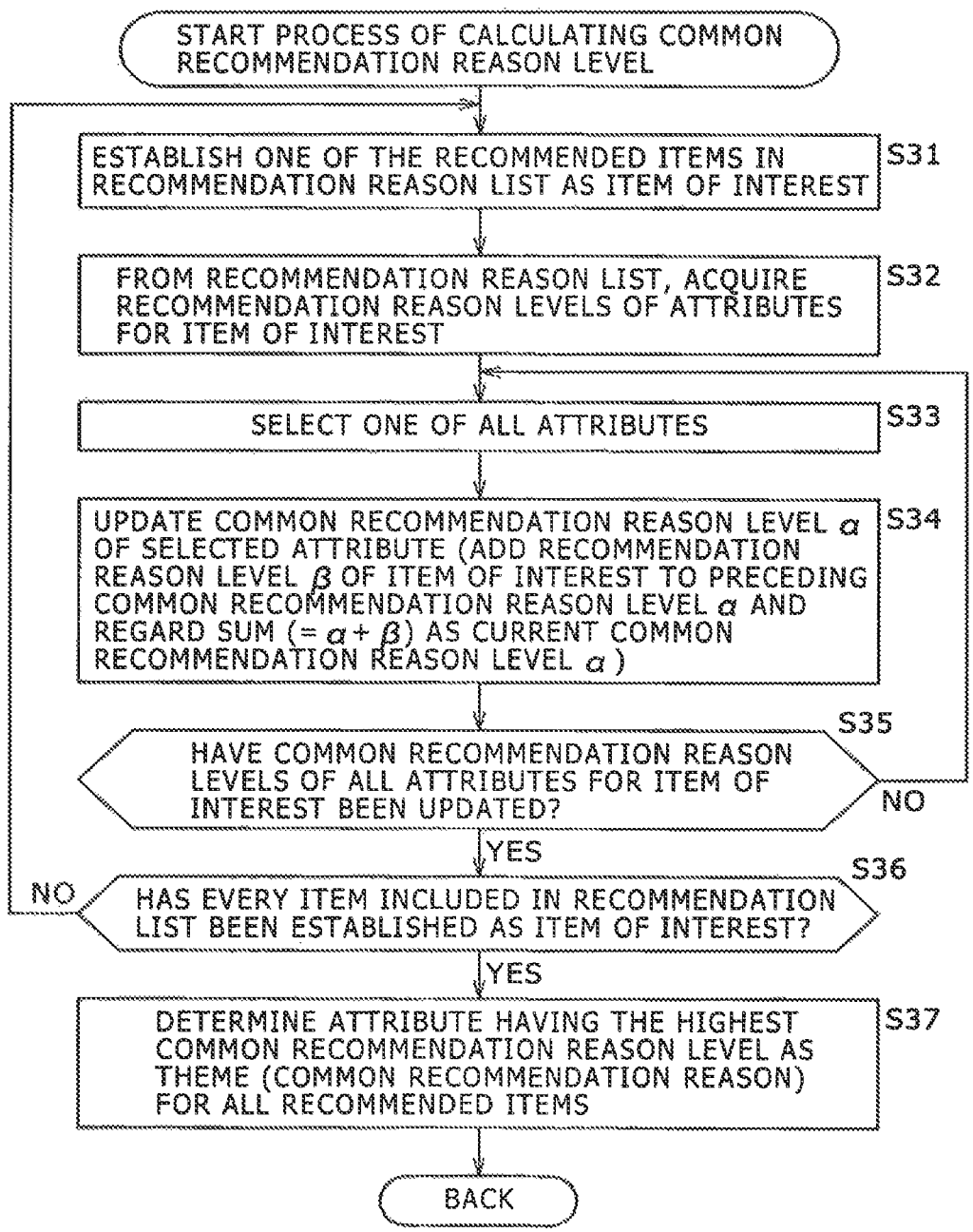
FIG. 12 is a flowchart of detailed steps constituting the process of calculating a common recommendation reason level, the process being carried out in step S3 of FIG. 6 as part of the common recommendation reason presenting process.

One preferred structure of the first information processing apparatus above may further include an item-specific recommendation reason determining device (e.g., recommendation reason determining device 4 in FIG. 1 for performing the process of calculating the common recommendation reason level of each item in FIGS. 6 and 9) which establishes successively each of the plurality of recommended items determined by the recommending device as the item of interest, performs a first calculation based on a first calculation technique on each of the N components of the item characteristic vector for the item of interest by use of a component value corresponding to each of the N components as well as the corresponding component value constituting part of the comparison basis vector, determines the value resulting from the first calculation as a recommendation reason level of the attribute corresponding to the component being dealt with, and determines as an item-specific recommendation reason the attribute of which the recommendation reason level satisfies a third condition; wherein the common recommendation reason determining device may establish successively each of the N attributes as the attribute of interest, perform a second calculation based on a second calculation technique using each of the recommendation reason levels determined by the item-specific recommendation reason determining device about the attribute of interest for each of the plurality of recommended items, and determine the attribute of interest as the common recommendation reason common to the plurality of recommended items if the value resulting from the second calculation satisfies the second condition (e.g., through execution of the process of calculating a common recommendation reason level in FIG. 12).

The present invention also provides the first information processing method including the steps of: (a) calculating levels of similarity between a standard form vector as a comparison basis vector and each of a plurality of item characteristic vectors of the standard form which are characteristic of a plurality of items, the standard form vector being made up of N components individually representative of N attributes of each of the plurality of items, N being an integer of at least 1, step (a) further determining as the items to be recommended to a user a plurality of items corresponding to the item characteristic vectors of which the level of similarity satisfies a first condition (e.g., step S1 of FIG. 6); (b) determining one of the N attributes of the plurality of recommended items determined in step (a) as a common recommendation reason common to the plurality of recommended items when the determined attribute satisfies a second condition (e.g., process of calculating a common recommendation reason level in step S2 of FIG. 6 and in FIG. 12); and (c) controlling presentation to the user of either the plurality of recommended items determined in step (a) or information about the recommended items, together with the common recommendation reason determined in step (b)(e.g., step S4 of FIG. 6).

The present invention further provides the second information processing apparatus (e.g., information processing apparatus 1 in FIG. 1) including: a common recommendation reason determining device (e.g., common recommendation reason determining device 5 in FIG. 5 for carrying out step S51 in FIG. 16) determining in advance one of N attributes of items as a common recommendation reason common to a plurality of items to be recommended to a user when the determined attribute satisfies a first condition, N being an integer of at least 1; a recommending device (e.g., recommendation list generating device 3 in FIG. 1 for carrying out steps S52 and 953 in FIG. 16) which, from among a plurality of item characteristic vectors of a standard form which are characteristic of a plurality of items, the standard form being a vector of which N components individually represent the N attributes, selects at least one item characteristic vector of which the component corresponding to the attribute determined as the common recommendation reason by the common recommendation reason determining device satisfies a second condition, the recommending device further calculating levels of similarity between a comparison basis vector of the standard form and each of at least one item characteristic vector selected in order to determine, as the items to be recommended to a user, a plurality of items corresponding to the item characteristic vectors of which the level of similarity satisfies a third condition; and a presenting device (e.g., presenting device 6 in FIG. 1 for carrying out step S54 in FIG. 16) presenting the user with either the plurality of recommended items determined by the recommending device or information about the recommended items, together with the common recommendation reason determined by the common recommendation reason determining device.

The present invention also provides the second information processing method including the steps of, (a) determining in advance one of N attributes of items as a common recommendation reason common to a plurality of items to be recommended to a user when the determined attribute satisfies a first condition, N being an integer of at least 1 (e.g., step SS1 in FIG. 16); (b) from among a plurality of item characteristic vectors of a standard form which are characteristic of a plurality of items, the standard form being a vector of which N components individually represent the N attributes, selecting at least one item characteristic vector of which the component corresponding to the attribute determined as the common recommendation reason in step (a) satisfies a second condition, step (b) further calculating levels of similarity between a comparison basis vector of the standard form and each of at least one item characteristic vector selected in order to determine, as the items to be recommended to a user, a plurality of items corresponding to the item characteristic vectors of which the level of similarity satisfies a third condition (e.g., steps S52 and S53 in FIG. 16); and (c) controlling presentation to the user of either the plurality of recommended items determined in step (b) or information about the recommended items, together with the common recommendation reason determined in step (a)(e.g., step S54 in FIG. 16).

The present invention further provides the program corresponding to the above-outlined first or second information processing method, as well as a recording medium which accommodates that program. The program is performed illustratively by a computer outlined in FIG. 17, as will be discussed later.

In preparation for a detailed description of the preferred embodiments of the present invention, some words and phrases are specifically defined and some basic techniques are explained below.

In this specification, "items" are defined as any software or hardware (i.e., products) that may be offered to users. For example, pieces of software referred to as contents such as TV programs, movies, photos and tunes (i.e., moving pictures, still pictures, voices, and their combinations) are some of the items applicable to this specification. Products such as wines (hardware) are also items that fall within the scope of this specification, and so are sentences and even conversations.

For purpose of simplification and illustration, wines put in suitable containers (e.g., 750-ml bottles) will be adopted as typical items in the description that follows.

Outlined below is a typical series of steps carried out generally for recommending items (the steps are simply called the recommendation process hereunder). It is assumed for convenience of explanation that one information processing apparatus performs the entire recommendation process.

A typical information processing apparatus first turns an item into a vector using as a basis vector each of N pieces of information (N is an integer of 1 or larger) denoting the characteristics of the item in question. In this case, the information processing apparatus weights as needed each of the components constituting the vector through the use of a suitable weighting technique.

In the description that follows, the vector of the item thus processed will be called the item characteristic vector. The information denoting the characteristics of the item will be referred to as attribute information, and pieces of information constituting attribute information as attributes. If a given item is associated with the attribute information about each of N attributes, then the N pieces of attribute information are expressed in numerical form (i.e., weighted). The N numeric values derived from these numbers are regarded as the components constituting an item characteristic vector.

For example, if the items handled are wines, their attributes include prices, varieties of the grapes used, taste, and aroma. Suppose that a given wine is priced at ¥10,000, made from the variety "a," and evaluated at 3 on the taste scale of 5 and at 2 on the aroma scale of 5. In that case, the wine is associated with information denoting the attributes "¥10,000," "variety a," "3," and "2." If the item characteristic vector of the wine is assumed to be defined by the component vectors of "price, grape variety, taste, and aroma," then the attributes "¥10,000," "variety a," "3," and "2" are turned into numeric values $\alpha$, $\beta$, $\gamma$, and $\theta$ ($\alpha$, $\beta$, $\gamma$, and —$\theta$ are any values independent of one another). These values are substituted into the first through the fourth components of a vector that forms the item characteristic vector for the wine in question.

If any of the N pieces of attribute information is not associated with a given item, zero is substituted into the component representing the corresponding attribute as part of the item characteristic vector of that item.

A standard form vector is defined as a vector whose N components are arrayed in their predetermined sequence. In the foregoing example, the vector having the components "price, grape variety, taste, aroma" arrayed in that order is regarded as a standard form vector with respect to the item characteristic vectors of wines.

Traditionally, the information processing apparatus generates and stores the item characteristic vectors of that standard form for each of the items involved.

Meanwhile, typical information processing apparatuses traditionally generate a standard form vector indicative of each user's preferences by resorting to the user's history and by utilizing various kinds of information input by the user in question. In the description that follows, the standard form vector representative of each user's preferences will be called the user preference vector (UPV).

Typically, the information processing apparatus finds levels of similarity between the user preference vector of each user on the one hand, and a plurality of stored item characteristic vectors in terms of cosine correlation and other factors on the other hand (i.e., in a matching process). The items associated with the item characteristic vectors whose levels of similarity are higher than a threshold value are presented to the user in question as recommended items. The above description has shown how traditional recommendation systems typically work.

As mentioned above, there already exist some information processing apparatuses that present to the user both recommended items and the reason for the recommendation. However, when presenting a plurality of recommended items to the user, the information processing apparatus has typically determined an independent reason for recommending each of the multiple recommended items. The technique of determining such reasons is relatively simple: of the components (attributes) of the standard form vector, the one (attribute) having the highest level of similarity between the UPV and the relevant item characteristic vector is presented as the reason for recommendation.

It should be noted that in the description that follows, the recommendation reason determined individually for each of a plurality of recommended items will be referred to as an item-specific recommendation reason.

Under the above circumstances, a large number of users presented with such item-specific recommendation reasons have failed to understand why such and such items were recommended. That is, information processing apparatuses have typically failed to present users with convincing reasons for recommendation.

With a view to overcoming such disadvantages and other drawbacks of the related art, this applicant has come up with the following technique: when a plurality of recommended items are to be presented, they are arranged into groups each sharing a minimum of one common attribute characterizing the group in question. The common attribute or attributes are regarded as a theme representative of the recommended item group as a whole (i.e., made up of a plurality of recommended items), and that theme is presented to the user. The above technique is implemented in specific steps proposed by this applicant. The theme is the reason for all that is recommended to the user (to whom a plurality of items are recommended). The theme will be called the common recommendation reason in the description that follows.

Adopting the inventive technique above makes it possible to present the user with recommended items together with convincing reasons. To be more persuasive, the common recommendation reason presented to the user may be accompanied by an item-specific recommendation reason for each of the recommended items. Detailed steps for determining the common recommendation reason will be discussed later by referring FIG. 6 and subsequent drawings.

A preferred embodiment of the present invention will now be described with reference to the accompanying drawings.

FIG. 1 is a block diagram showing a typical functional structure of a recommendation system to which the above-outlined inventive technique is applied and which embodies the present invention. In operation, the recommendation system of FIG. 1 searches a plurality of items for the items to be recommended to the user, determines a common recommendation reason (i.e., theme) for the recommended items, and presents the user with the plurality of recommended items together with the theme.

In this specification, the term "system" refers to an entire configuration made up of a plurality of component devices and a processor or processors. In this context, the recommendation system of FIG. 1 may be constituted by a single information processing apparatus or by a plurality of such apparatuses. For the presently preferred embodiment, it is assumed that the recommendation system of FIG. 1 is made up of one information processing apparatus. That is, FIG. 1 illustrates a typical functional structure of the information processing apparatus to which the present invention is applied.

In the example of FIG. 1, the information processing apparatus is arranged to include diverse component devices ranging from a user preference vector storing device 1 to a presenting device 6.

When implemented, each of the component devices ranging from the user preference vector storing device 1 to the presenting device 6 is not limited in any way. In particular, a recommendation list generating device 3, a recommendation reason determining device 4, and a common recommendation reason determining device 5 may each be structured by software, by hardware or by a combination of both.

The user preference vector storing device 1 holds standard form user preference vectors. An item characteristic vector storing device 2 holds a standard form item characteristic vector for each of a plurality of items. With this embodiment, for example, "n" items (n is an integer of at least 1) are associated with "n" item characteristic vectors stored in the item characteristic vector storing device 2.

More specifically, this embodiment assumes that the items handled are wines and that standard form user preference vectors and item characteristic vectors are each formed by the components of "aroma, color (red), color (white), variety A, and variety B." Each of the components will be discussed later in more detail.

The recommendation list generating device 3 finds levels of similarity between the user preference vector held in the user preference vector storing device 1 on the one hand, and "n" item characteristic vectors held in the item characteristic vector storing device 2 in terms of cosine correlation and other factors on the other hand. Based on the levels of similarity thus obtained, the recommendation list generating device 3 calculates the recommendation reason level for each of the items corresponding to the plurality of item characteristic vectors. Although the technique of calculating recommendation reason levels is not subject to particular constraints, this embodiment considers the level of similarity with regard to be the recommendation reason level for purpose of illustration and simplification. The recommendation list generating device 3 proceeds to determine as the items to be recommended to the user at least one item (i.e., wines for this embodiment) corresponding to the item characteristic vectors whose recommendation reason levels are higher than a predetermined threshold value. The recommendation list generating device 3 then generates a list that provides information identifying the recommended item or items (the list is called the recommendation list), and forwards the generated list to the recommendation reason determining device 4.

The information identifying recommended items such as wines for this embodiment illustratively includes the appellations of wines, their producing regions, and winemakers (domaines and wineries). Naturally, the recommendation list may also be arranged to include other information such as the prices of wines and the reasons for recommending particular wines. With this embodiment, however, the recommendation list output by the recommendation list generating device 3 includes only the names of the items (i.e., appellations of wines) and the recommendation reasons (i.e., levels of similarity with this embodiment) associated therewith, as will be described later with reference to FIG. 8.

The recommendation reason determining device 4 determines an item-specific recommendation reason for each of the recommended item or items contained in the recommendation list supplied by the recommendation list generating device 3, generating a list that enumerates the results of what has been determined (see FIG. 11, to be discussed later). The list thus generated is sent to the common recommendation reason determining device 5 together with the recommendation list. That list is called a recommendation reason list as distinguished from the recommendation list and other lists in the description that follows. The technique of generating the recommendation reason list will be discussed later along with specific examples of the list.

Based on the recommendation reason list coming from the recommendation reason determining device 4, the common recommendation reason determining device 5 determines a common recommendation reason (i.e., theme). The common recommendation reason thus determined is forwarded to the presenting device 6 together with the recommendation list and recommendation reason list mentioned above.

Given the common recommendation reason (theme), recommendation list, and recommendation reason list from the common recommendation reason determining device 5, the presenting device 6 generates an image which at least includes the common recommendation reason and each of the recommended items (and their names). The generated image, called a recommendation image, is then presented to the user. That is, the presenting device 6 of this embodiment is structured to have a suitable display unit that displays the recommendation image.

The recommendation image may be any kind of image as long as it includes the common recommendation reason and each of the recommended items and their names as mentioned above.

More specifically, the images shown in FIGS. 2 through 5 may be adopted as recommendation images. These images are examples of what is presented to the user in image form.

In the example of FIG. 2, a recommendation image 11 displays messages "welcome to the wine recommending service" and "the following wines are recommended to you favoring - - -," in that order from the top down. In the second message, a common recommendation reason (theme) is placed in the blank field. In FIG. 2, the common recommendation reason (theme) of "wines with a robust aroma" is indicated. The user can easily recognize that the wines listed in this recommendation image 11 are recommended primarily for their robust aroma.

Under the indication of the common recommendation reason is the information identifying the specific items recommended. In the example of FIG. 2, each row of the information indicates the appellation of a recommended wine on the left-hand side, and the level of similarity with regard to the user preference vector in effect on the right-hand aide. In FIG. 2, each level of similarity is represented by the number of solid stars (★). The larger the number of solid stars, the higher the level of similarity. More specifically, in FIG. 2, the wine with the appellation "chateau ○○○" is recommended with the stars representing level five of similarity, and the wine with the appellation "chateau xxx" is recommended with the stars denoting level three of similarity.

For most of the recommended items, the attribute adopted as the common recommendation reason ("aroma" in the example of FIG. 2) is also employed as the item-specific recommendation reason for each item. For some recommended items, however, the attribute selected as the common recommendation reason is not used as an item-specific recommendation reason.

In such cases, the recommended items for which the attribute adopted as the common recommendation reason is not used as the item-specific recommendation reason may be excluded (the excluded items are called "commonly recommended but individually unadvised items") from the recommendation image (i.e., not presented to the user). Alternatively, these items may be considered "unexpected" but recommendable items for the user and may be included in the recommendation image (i.e., presented to the user) along with an appropriate comment. For example, a recommendation image 12 shown in FIG. 3 may be used to give such presentations.

The recommendation image 12 in FIG. 3 is basically the same in layout as the above-described recommendation image 11 in FIG. 2 and thus will not be described further.

In the example of FIG. 3, the wine with the appellation "ΔΔ (domaine □□) is presented as a commonly recommended but individually unadvised item. The aroma adopted as the common recommendation reason does not apply to this wine as an item. Thus on the right-hand side of the star notation for this item appears a comment "with a twist in taste" indicating that this recommended item is a surprise for the user.

On the other hand, the wines with the appellations "chateau ○○○" and "chateau xxx" each have an item-specific recommendation reason "aroma" that is identical to their common recommendation reason. For that reason, no comment is furnished to the right of their star notations.

Figure 4:
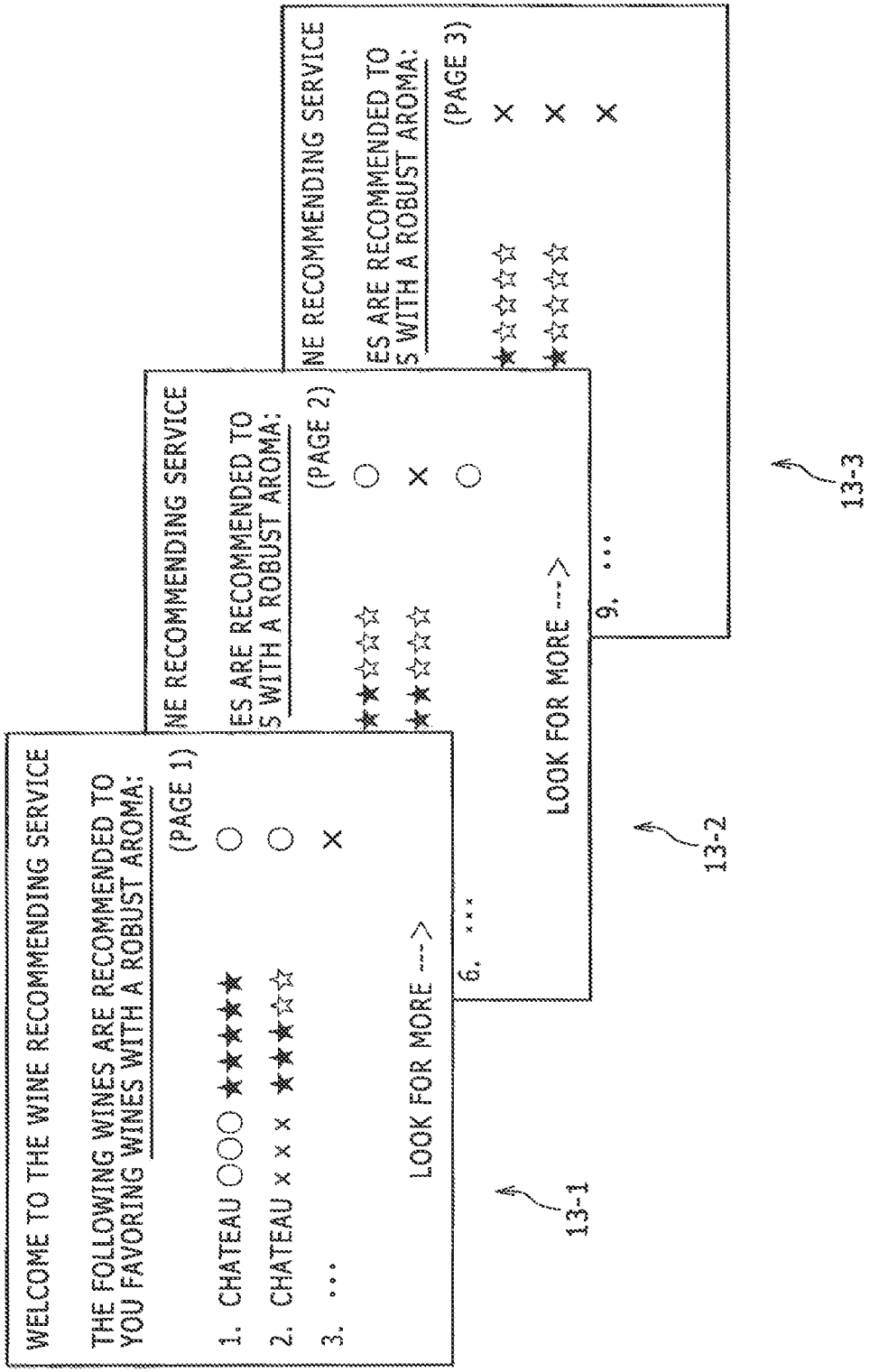
FIG. 4 is a schematic view showing another typical image presented to the user by the information processing apparatus of FIG. 1.

As another alternative, images 13-1 through 13-3 shown in FIG. 4 may be adopted as recommendation images. The example in FIG. 4 presupposes the use of a small-size screen such as the screen of portable terminals. The images are divided so that each of them may be accommodated by the undersized screen. Each of the images 13-1 through 13-3 carries a message indicating the page number (pages 1, 2, 3). The image 13-1, the first of the series of pages, includes at its bottom an operation area indicated as "look for more." This area is operated on to look up the next page (image 13-2). The operation area is also furnished on the second page (image 13-2).

Obviously, the number of divided recommendation images is not limited to that of the example in FIG. 4 (with three images). In general, the number of divided recommendation images is dependent on the screen size in use and on the total number of recommended items.

What distinguishes the example of FIG. 4 from that of FIG. 2 or 3 is that in each of the recommended images 13-1 through 13-3 in FIG. 4, a circle (○) or a cross (x) is indicated in the rightmost position of each of the rows denoting the recommended items.

The circle symbol (○) shows that the item in question is a recommended item for which the common recommendation reason ("aroma" in the example of FIG. 4) is also adopted as the item-specific recommendation reason (the item is called a commonly and individually recommended item). The cross symbol (x) indicates that the item is a commonly recommended but individually unadvised item.

The recommendation images 13-1 through 13-3 in FIG. 4 are basically the same in terms of layout as the above-described recommendation image 11 in FIG. 2 or recommendation image 13 in FIG. 3 and thus will not be described further.

In any recommendation image, the sequence of a plurality of recommended items displayed is not limited. That is, the recommended items may be displayed in any sequence, each of their ordinal positions being indicated numerically in the leftmost position of each row.

More specifically, the recommendation images 13-1 through 13-3 in FIG. 4 show illustratively the recommended items in order of the levels of similarity with regard to the user reference vector in effect (i.e., in order of recommendation levels). Alternatively, the recommended items may be arrayed in such a sequence as is indicated in recommendation images 14-1 through 14-3 of FIG. 5.

The recommendation images 14-1 through 14-3 in FIG. 5 have the recommended items, which are the same as those in the recommendation images 13-1 through 13-3 of FIG. 4, arranged in the following sequence: the commonly and individually recommended items (furnished with the circle symbol (○)) come first, followed by the commonly recommended but individually unadvised items (with the cross symbol (x)).

Figure 5:
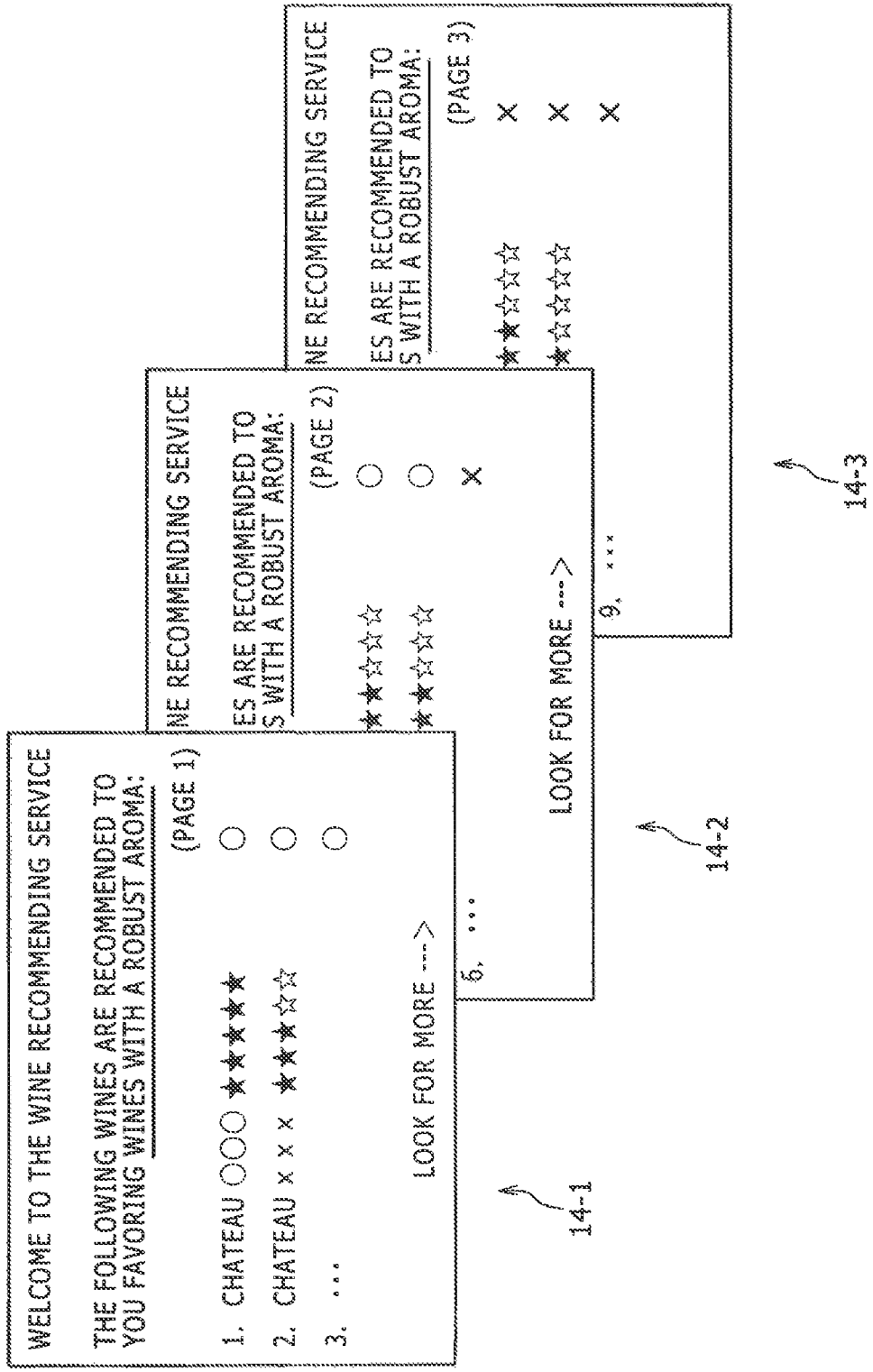
FIG. 5 is a schematic view showing another typical image presented to the user by the information processing apparatus of FIG. 1.

Although the circle-furnished recommended items in FIG. 5 are arrayed in order of the levels of similarity with regard to the user preference vector in effect (i.e., in order of recommendation levels), this is not limitative of the invention. Alternatively, the recommended items may be arranged in order of recommendation reason levels (to be described later) for the attribute adopted as the common recommendation reason ("aroma" in the examples of FIGS. 4 and 5). As another alternative, the recommended items may be arrayed in descending order of the component values of the attribute adopted as the common recommendation reason ("aroma" in the examples of FIGS. 4 and 5).

Likewise, whereas the cross-furnished recommended items in FIG. 5 are arrayed in order of the levels of similarity with regard to the user preference vector in effect (i.e., in order of recommendation levels), this is not limitative of the invention.

Some examples of the recommendation images have been described above with reference to FIGS. 2 through 5. To reiterate the foregoing explanation, the implementation of recommendation images is not limited to the examples in FIGS. 2 through 5. Illustratively, the levels of similarity shown on the right-hand side of each recommended item (i.e., recommended wines) in the examples of FIGS. 2 through 5 may be supplemented with diverse kinds of information (not shown) including the item-specific recommendation reason for each item.

Figure 6:
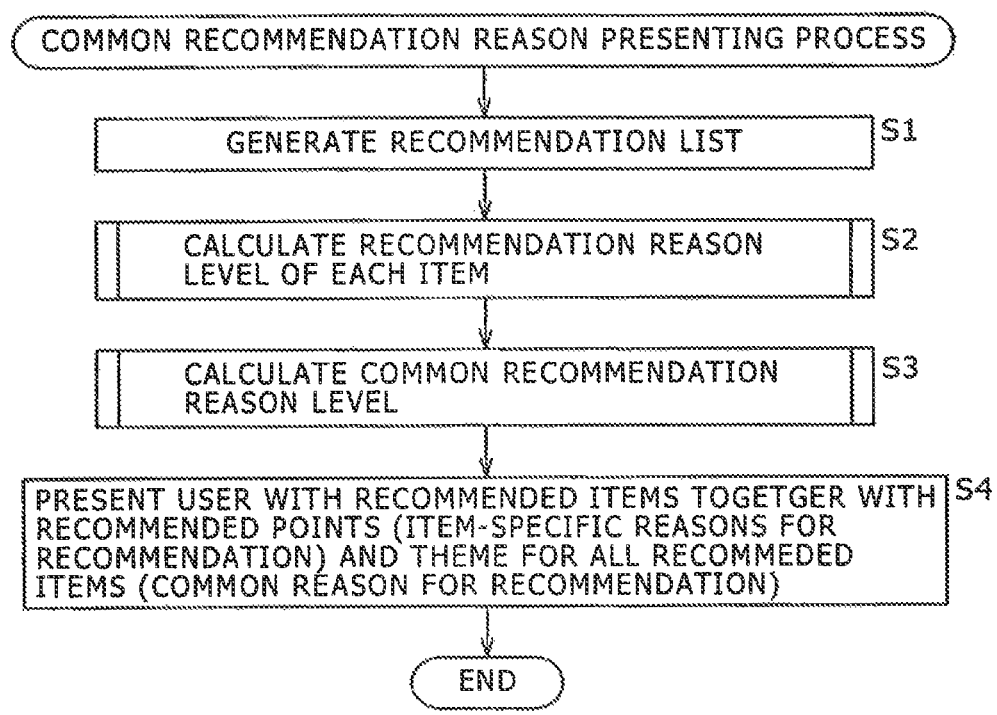
FIG. 6 is a flowchart of steps constituting a common recommendation reason presenting process carried out by the information processing apparatus of FIG. 1.

Described below with reference to the flowchart of FIG. 6 is a series of steps performed by the information processing apparatus of FIG. 1 in order to present the user with recommended items and a common recommendation reason (theme) for these items. The series of steps referred to as the common recommendation reason presenting process in FIG. 6 will also be mentioned as such in the description that follows.

In step S1, the recommendation list generating device 3 in FIG. 1 generates a recommendation list and forwards the generated list to the recommendation reason determining device 4.

In a first stage of step S1, as described above, the recommendation list generating device 3 calculates the levels of similarity between the user preference vector of a given user held in the user preference vector storing device 1 on the one hand, and each of the characteristic vectors for each of a first through an n-th item stored in the item characteristic vector storing device 2 on the other hand. Typical levels of similarity resulting from the calculation are listed in FIG. 7.

In a second stage of step S1, the recommendation list generating device 3 determines recommendation levels of the items based on the calculated levels of similarity, and selects as the recommended items those items of which the recommendation levels correspond to the item characteristic vectors satisfying a predetermined condition. With this embodiment, the levels of similarity are taken unmodified as the recommendation levels as mentioned earlier. It is assumed for this embodiment that the items whose levels of similarity (recommendation levels) are 0.6 or higher are determined as the recommended items. On that assumption, as indicated in FIG. 7, the first, third and the fifth items with their levels of similarity at 0.8, 0.9 and 0.7 respectively are determined as the recommended items.

In a third stage of step S1, the recommendation list generating device 3 generates a recommendation list that includes the recommended item or items (i.e., appellations) determined in the second stage and the levels of similarity of these items, and supplies the generated list to the recommendation reason determining device 4. Illustratively, a recommendation list 21 shown in FIG. 8 is generated (i.e., a typical recommendation list).

After the recommendation list is generated by the recommendation list generating device 3 and forwarded to the recommendation reason determining device 4, control is passed on to step S2.

In step S2, as mentioned above, the recommendation reason determining device 4 determines an item-specific recommendation reason for each of the recommended item or items included in the recommendation list, and generates a recommendation reason list that enumerates the determined reasons. The recommendation reason list is sent to the common recommendation reason determining device 5 together with the recommendation list. In the ensuing description, what takes place in step S2 will be referred to as the process of calculating the recommendation reason level of each item. That process will be discussed later in more detail with reference to FIGS. 9 through 11.

In step S3, as described above, the common recommendation reason determining device 5 determines a common recommendation reason (theme) based on the recommendation reason list supplied from the recommendation reason determining device 4. The common recommendation reason thus determined is supplied to the presenting device 6 together with the recommendation list and recommendation reason list. In the ensuing description, what takes place in step S3 will be referred to as the process of calculating a common recommendation reason level. That process will be discussed later in more detail with reference to FIGS. 12 through 15.

In step S4, the presenting device 6 presents the user with the recommended items along with recommended points (i.e., item-specific recommendation reasons) and the theme common to all recommended items (i.e., common recommendation reason). This completes the common recommendation reason presenting process.

In the common recommendation reason presenting process of FIG. 6, recommended points are shown presented in step S4. However, the presentation of recommended points is not mandatory. Whereas the example of FIG. 6 is shown presenting item-specific recommendation reasons as the recommended points, this is not limitative of the invention. Alternatively, levels of similarity may be presented in their place as described above. In this case, if what is presented is assumed to appear as images on the screen, then recommendation images such as those in FIGS. 2 through 5 above are presented to the user in step S4.

Given below are detailed descriptions of the process of calculating the recommendation reason level of each item in step S2, and of the process of calculating a common recommendation reason level in step S3. The processes in steps S2 and S3 will be discussed separately in detail, in that order.

Figure 9:
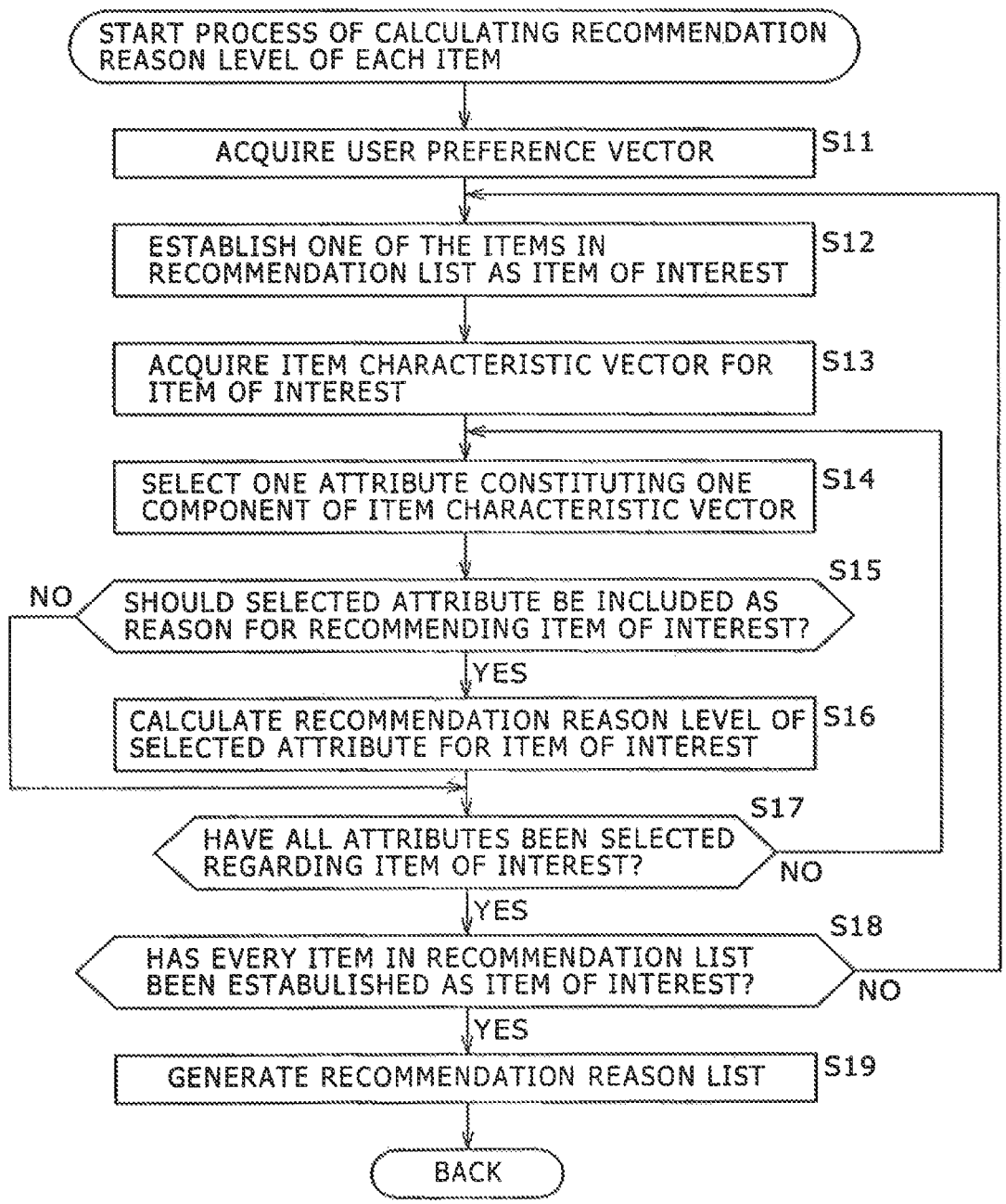
FIG. 9 is a flowchart of detailed steps constituting the process of calculating the recommendation reason level of each item, the process being carried out in step S2 of FIG. 6 as part of the common recommendation reason presenting process.

First to be detailed with reference to FIGS. 9 through 11 is the process of calculating the recommendation reason level of each item in step S2. FIG. 9 is a flowchart of detailed steps constituting that process.

In step S11 of FIG. 9, the recommendation reason determining device 4 acquires the user preference vector of a given user from the user preference vector storing device 1.

Illustratively, it is assumed that the vector on row 1 named "user" in FIG. 1 is acquired in step S11 as the user preference vector composed of "aroma, color (red), color (white), variety (A), variety (B)=(2.5, 0, 1, 0.5, 0.7)." FIG. 1 shows examples of a typical user preference vector and item characteristic vectors. More about the item characteristic vectors will be discussed later.

Each of the components making up the user preference vector represents the preferences of the user in question, the preferences being derived illustratively from the user's past operation history. With this embodiment, it is assumed for purpose of simplification that the item characteristic vectors of the wines purchased by each user in the past are stored as operation histories and that the values of the components constituting each user preference vector are determined on the basis of the components of the stored item characteristic vectors.

Also with this embodiment, it is assumed for purpose of illustration that all wines, regardless of whether they have ever been purchased by any user, have their "aroma," "variety A," and "variety B" numerically determined on the scale of 0 to 3 by winemakers and/or service providers of the recommendation system in FIG. 1 through sampling. The numbers thus determined are substituted into the first, the fourth, and the fifth components (i.e., aroma, variety A, and variety B) of each item characteristic vector. For the component "aroma," it is assumed that the higher the value, the stronger the aroma of the wine in question. For each of the varieties A and B, the higher the value, the better expressed the characteristic of the variety in question.

If the wine of interest is a red wine, it is assumed that the value of 1 is substituted into the second component "color (red)" and zero into the third component "color (white)." In the case of a white wine, the value of 0 is substituted into the second component "color (red)" and 1 into the third component "color (white)." For purpose of simplification, wines that are difficult to classify (rose wine, sparkling wine, etc.) are excluded from the examples.

In the description that follows, what is referred to as the numeric attribute in FIG. 10 is an attribute which has only one component such as the "aroma" in FIG. 10 and of which the level is numerically denoted. Also in the ensuing description, what is referred to as the appellation attribute in FIG. 10 is an attribute which has a plurality of attributes (appellations) such as the "color" group having the components "red" and "white" and the "variety" group made up of the components "A" and "B" as indicated in FIG. 10, the attributes or their components being represented individually by a value or by a true-false notation (OX).

With this embodiment, as mentioned above, the values of the components making up each user preference vector are determined on the basis of the components constituting the item characteristic vectors of all wines purchased so far by the user in question. With this embodiment, for purpose of simplification, the component values of each user preference vector are determined illustratively as follows:

For each of the user preference vectors of this embodiment, the component values of "aroma," "variety A," and "variety B" are each assumed to be an average of the values of the corresponding component in the item characteristic vectors of all wines purchased so far by a given user.

The values representing each of the components "color (red)" and "color (white)" in the item characteristic vectors of all wines purchased by the user in the past are totaled. The two sum totals are compared. The larger of the two sums indicates the type of wine (red or white) of which the user has so far purchased more wines than the other type. The value of 1 is then substituted into that component of the user preference vector which denotes the red or the white type preferred by the user. The value of zero is substituted into that component of the user preference vector which is representative of the type of wine less favored by the user.

Obviously, the technique of determining the value of each of the components making up the user preference vector is not limited to the examples described above.

Returning to FIG. 9, control is transferred from step S11 to step S12 once the user preference vector is acquired.

In step S12, the recommendation reason determining device 4 establishes one of the items included in the recommendation list as the item of interest.

In this example, the recommendation list 21 in FIG. 8 has been fed from the recommendation list generating device 3 to the recommendation reason determining device 4 as described above. Thus in step S12, one of the first, the third, and the fifth items is established as the item of interest. For this example, it is assumed that the first item is established as the item of interest.

In step S13, the recommendation reason determining device 4 acquires the item characteristic vector of the item of interest from the item characteristic vector storing device 2. In this example, the item characteristic vector of the first item is acquired.

In step S14, the recommendation reason determining device 4 selects the attribute corresponding to one of the components constituting the item characteristic vector. In this example, one of the five attributes "aroma," "color (red)," "color (white)," "variety (A)," and "variety (B)" is selected in step S14.

In step S15, the recommendation reason determining device 4 checks to determine whether or not to have the selected attribute included in an item-specific recommendation reason.

The condition serving as the criterion by which to determine whether to have the selected attribute included in the item-specific recommendation reason is not limited in any way. Diverse conditions may be adopted with regard to different attributes. Some of the typical conditions will be discussed later.

If it is determined in step S15 that the selected attribute is not to be included in the item-specific recommendation reason, then control is passed on to step S17.

On the other hand, if it is determined in step S15 that the selected attribute is to be included in the item-specific recommendation reason, then control is transferred to step S16.

In step S16, the recommendation reason determining device 4 calculates the recommendation reason level for the selected attribute of the item of interest.

The technique of calculating the recommendation reason level is not particularly limited. Various techniques may be applied to different attributes. A typical technique of calculating the recommendation reason level will be discussed later.

If the result of the check in step 15 is affirmative ("YES"), then step S16 is reached and executed followed by step S17. If the result of the check in step S15 is negative ("NO"), then step S17 is reached immediately.

In step S17, the recommendation reason determining device 4 checks to determine whether the recommendation reason levels for all attributes of the item of interest have been calculated.

If it is determined in step S17 that the recommendation reason levels for all attributes have yet to be calculated, then control is returned to step S14 and the subsequent steps are repeated. In this example, a loop made up of steps S14 through S16 is repeated, whereby some of the five attributes "aroma," "color(red)," "color (white)," "variety (A)," and "variety (B)" are selected as item-specific recommendation reasons, and their recommendation reason levels are calculated.

When it is determined in step S17 that the recommendation reason levels for all attributes of the items of interest have been calculated, control is passed on to step S18.

In step S18, the recommendation reason determining device 4 checks to determine whether all items included in the recommendation list have been established as the item of interest.

If it is determined in step S18 that not all items in the recommendation list have been established as the item of interest, then control is returned to step S12 and the subsequent steps are repeated. In this example, a loop formed by steps S12 through S18 is repeated so that each of the remaining items (i.e., the third and the fifth items in this case) is successively established as the item of interest. For each item of interest thus established, some of the five attributes "aroma," "color (red)," "color (white)," "variety (A)," and "variety (B)" are selected as item-specific recommendation reasons and their recommendation reason levels are calculated.

When it is determined in step S18 that all items included in the recommendation list have been established as the item of interest, control is passed on to step S19.

In step S19, the recommendation reason determining device 4 generates a recommendation reason list. Specifically, it is assumed for this example that a recommendation reason list 22 shown in FIG. 11 is generated (i.e., a typical recommendation reason list).

What follows is a description of some typical conditions according to which this embodiment generates the recommendation reason list 22 of FIG. 11 in step S19 above, as well as some typical techniques by which this embodiment calculates the recommendation reason level in step S16.

It is assumed here that the item characteristic vector of the first item is the vector named "first item" on row 2 in FIG. 10, the components of the vector being set to (1.0, 0, 1, 2.1, 1.0) for "aroma," "color(red)," "color (white)," "variety (A)," and "variety (B), respectively; that the item characteristic vector of the third item is the vector named "third item" on row 3 in FIG. 10, the components of the vector being set to (2.0, 1, 0, 3.0, 2.0) for "aroma," "color (red)," "color (white)," "variety (A)," and "variety (B), respectively; and that the item characteristic vector of the fifth item is the vector named "fifth item" on row 4 in FIG. 10, the components of the vector being set to (3.0, 1, 0, 1.5, 0.5) for "aroma," "color (red)," "color (white)," "variety (A)," and "variety (B)," respectively.

First to be described is a typical condition serving as the basis for the check in step S15 regarding the attribute "aroma," along with a typical technique of calculating the recommendation reason level in step S16.

In this example, the recommendation reason determining device 4 performs the expression (1) below to calculate the level of similarity regarding the attribute "aroma" of the item of interest in step S15. The expression is given as follows:

$$\text{Level of similarity regarding attribute "aroma"} = \quad (1)$$
$$\frac{\text{Max}_{dist} - |\text{Usr}_{value} - \text{Item}_{value}|}{\text{Max}_{dist}}$$

where, $$\text{Max}_{dist} = \text{Max}_{value} - \text{Min}_{value} \quad (2)$$

In the expression (1) above, $\text{Max}_{dist}$ is the value defined by another expression (2) above. In the expression (2), $\text{Max}_{value}$ stands for the largest of the values representing the component "aroma" for the item characteristic vectors of all recommended items in the recommendation list, and $\text{Min}_{value}$ indicates the smallest of these component values. $\text{Usr}_{value}$ denotes the value of the component "aroma" of the user preference vector, and $\text{Item}_{value}$ represents the value of the component "aroma" in the item characteristic vector of the item of interest.

According to what is shown in FIG. 10, $\text{Max}_{value}$ is 3.0 and $\text{Min}_{value}$ is 1.0, so that $\text{Max}_{dist}$ is 2.0 while $\text{Usr}_{value}$ is 2.5. When the first, the third, and the fifth items are each established successively as the item of interest, $\text{Item}_{value}$ is given as 1.0, 2.0 and 3.0, respectively. That means the levels of similarity regarding "aroma" of the first, the third, and the fifth items are given as 0.25, 0.75, and 0.75, respectively.

In step S15, the recommendation reason determining device 4 proceeds to adopt (i.e., include) the attribute "aroma" as the item-specific recommendation reason if the level of similarity regarding "aroma" of the item of interest is found higher than a predetermined threshold value. If the level of similarity regarding "aroma" of the item of interest is lower than the threshold value, then the attribute "aroma" is excluded from the item-specific recommendation reason.

Suppose that the threshold value is set to 0.7. In that case, the attribute "aroma" of the first item in the above example is excluded from the item-specific recommendation reason. For the third and the fifth items, by contrast, the attribute "aroma" is adopted as the item-specific recommendation reason.

That is, step S16 is not performed on the first item. Step S16 is carried out on the third and the fifth items so that the recommendation reason level regarding the attribute "aroma" is calculated illustratively as outlined below.

In step S16, the recommendation reason determining device 4 performs the expression (3) below to calculate the recommendation reason level regarding "aroma" of the item of interest. The expression (3) is given as follows:

$$\text{recommendation reason level regarding attribute "aroma"} = \quad (3)$$
$$\frac{\text{Max}_{dist} - |\text{Item}_{value} - \text{Discrete}_{value}|}{\text{Max}_{dist}}$$

where, $$\text{Discrete}_{value} = \{1 \text{ or } 2 \text{ or } 3 (\text{in the case of attribute "aroma"})\} \quad (4)$$

In the expression (3) above, $\text{Max}_{dist}$ is the value defined by the expression (2) shown earlier, and $\text{Item}_{value}$ represents the value of the component "aroma" in the item characteristic vector of the item of interest. In the expression (3) above, each of a predetermined plurality of discrete values that fall within the probable range of values for "aroma" is substituted into $\text{Discrete}_{value}$. In this example, as shown in the expression (4), above, the value of 1, 2, or 3 is substituted into $\text{Discrete}_{value}$.

In this example, as mentioned above, $\text{Max}_{dist}$ is 2.0. When the third and the fifth items are each established successively as the item of interest, $\text{Item}_{value}$ takes on the values of 2.0 and 3.0 respectively. Thus as shown in the recommendation reason list 22 of FIG. 11, the third item is given the recommendation reason levels of 0.5, 1.0, and 0.5 at levels "1," "2," and "3" for the attribute "aroma," respectively.

For the third item, the attribute "aroma" has been adopted as the item-specific recommendation reason. Each recommendation reason level indicates which of the three recommendation reason levels "1," "2," and "3" for the attribute "aroma" is emphasized, i.e., how much the attribute "aroma" is appreciated when evaluated.

The recommendation reason level of each attribute is used to determine a common recommendation reason, as will be discussed later. For that reason, the scale on which to evaluate recommendation reason levels should be common to all attributes. With this embodiment, the recommendation reason levels of all attributes are normalized so as to fall within the range of 0 through 1.

Likewise, as shown in the recommendation reason list 22 of FIG. 11, the fifth item is given the recommendation reason levels of 0, 0.5, and 1 at levels "1," "2," and "3" for the attribute "aroma," respectively.

As described above, the attribute adopted in step S15 as the item-specific recommendation reason is subjected in step S16 to the calculation of its recommendation reason level. In step S19, as indicated in FIG. 11, the calculated recommendation reason levels are written to the corresponding entries in the recommendation reason list 22.

What has been discussed above are the typical condition serving as the basis for determination in step S15 regarding the attribute "aroma" and the typical technique of calculating recommendation reason levels for the same attribute in step S16.

What follows is a description of a typical condition serving as the basis for determination in step S15 regarding the attribute "color (red, white)" and a typical technique of calculating recommendation reason levels for the same attribute in step S16.

In this example, the recommendation reason determining device 4 in step S15 establishes as the component of interest one of the two components "color (red)" and "color (white)," whichever has the value "1" substituted therein, of the user preference vector. Where the component of interest in the user preference vector has the value "1" substituted therein, the attribute corresponding to the component of interest (e.g., a particular color) is adopted (i.e., included) as the item-specific recommendation reason. Where the component of interest has the value "0" substituted therein, the attribute corresponding to that component is excluded from the item-specific recommendation reason.

More specifically, in the example of FIG. 10, the attribute "color (white)" is established as the component of interest. Thus for the first item corresponding to the item characteristic vector in which the component of interest has the value "1" substituted therein, the attribute "color (white)" is adopted as the item-specific recommendation reason. For the third and the fifth items, by contrast, the attributes "color (white)" and "color (red)" are not adopted (i.e., excluded) as the item-specific recommendation reason.

It follows that step S16 is not performed on the third and the fifth items while step S16 is carried out on the first item.

The recommendation reason level regarding the attribute "color (white)" for the first item is calculated illustratively as follows:

In step S16, the recommendation reason determining device 4 takes as the recommendation reason level the component value "1" for the attribute "color (white)" in the item characteristic vector of the item of interest. Since the component value is either "0" or "1" for the attributes "color (white)" and "color (red)," there is no need to normalize the component values of these attributes.

Later in step S19, as shown in FIG. 11, the value "1" is substituted into the entry on row 1 (indicating the first item), column 5 (indicating the attribute "color (white)") in the recommendation list 22.

What has been discussed above are the typical condition serving as the basis for determination in step S15 regarding the attribute "color (red, white)" and the typical technique of calculating recommendation reason levels for the same attribute in step S16.

What follows is a description of a typical condition serving as the basis for determination in step S15 regarding the attribute "variety (A, B)" and a typical technique of calculating recommendation reason levels for the same attribute in step S16.

In this example, the recommendation reason determining device 4 in step S15 multiplies each of the values representing the components "variety (A)" and "variety (B)" in the user preference vector by the corresponding one of the values denoting the components "variety (A)" and "variety (B)" in the item characteristic vector of the item of interest. The attribute of which the product is found equal to or higher than a predetermined threshold value is adopted (i.e., included) as the item-specific recommendation reasons the attribute of which the product is found lower than the threshold value is excluded from the item-specific recommendation reason.

More specifically, suppose that the threshold value is defined as 1.0. For the first item in the example of FIG. 10, the product resulting from multiplication of the values for the component "variety (A)" is 1.05 (=0.5×2.1), which is the only product higher than 1.0. Thus the attribute "variety (A)" is adopted as the item-specific recommendation reason for the first item. For the third item, the product from multiplication of the values for the component "variety (A)" is 1.5 (=0.5×3.0) and the product from multiplication of the values for the component "variety (B)" is 1.0 (=0.5×2.0). Because both products are equal to or higher than the threshold value, the attribute "variety (A)" and the attribute "variety (B)" are both adopted as the item-specific recommendation reason for the third item. For the fifth item, the product from multiplication of the values for the component "variety (A)" is 0.75 (=0.5×1.5) and the product from multiplication of the values for the component "variety (B)" is 0.25 (=0.5×0.5). Both products are lower than the threshold value, so that neither the attribute "variety (A)" nor the attribute "variety (B)" is adopted as the item-specific recommendation reason for the fifth item.

It will be appreciated from the foregoing description that step S16 is not performed on the fifth item. By contrast, step S16 is carried out on the first and the third items. The recommendation reason level regarding the attribute "variety (A)" or "variety (B)" (variety (A) for the first item) is then calculated illustratively as outlined below.

As mentioned above, the values representing the components "variety (A)" and "variety (B)" in the item characteristic vector are allowed to fall within the range of 0 through 3. That is, the value can be larger than 1. The products resulting from multiplication involving the user preference vector can also be larger than the threshold value "1." That means the component values of "variety (A)" and "variety (B)" in the item characteristic vector or the products involving the user preference vector cannot be used unmodified as recommendation reason levels on the scale of 0 to 1.

In that case, the recommendation reason determining device 4 in step S16 illustratively performs the expression (5) below to normalize the products from multiplication of the component values of "variety (A)" and "variety (B)" by their counterparts in the user preference vector, in such a manner that the results will fall within the rage of 0 to 1. The expression is given as follows:

$$\text{recommendation reason level of attribute} = \frac{\text{Item}_{value} \times \text{Usr}_{value}}{\text{Product}_{max}} \quad (5)$$

In the expression (5) above, $\text{Usr}_{value}$ represents the component value of "variety (A)" or "variety (B)" in the user preference vector, and $\text{Item}_{value}$ denotes the component value of "variety (A)" or "variety (B)" in the item characteristic vector of the item of interest. That is, the numerator on the right side of the expression (5) indicates the product from multiplication of a given component value by its counterpart in the user preference vector. In the expression (5), the denominator $\text{Product}_{max}$ stands for the largest of the products from multiplication of each of the component values of "variety (A)" and "variety (B)" in the item characteristic vectors of all recommended items in the recommendation list, by the corresponding one of the component values in the user preference vector.

Obviously, the normalizing technique is not limited to what was discussed above using the expression (5).

In step S19, as shown in FIG. 11, the value "0.7" resulting from calculation of the expression (5) above is substituted into the entry on row 1 (indicating the first item), column 6 (denoting the variety A) in the recommendation list 22. The value "1.0" from calculation of the expression (5) is substituted into the entry on row 2 (representing the third item), column 6 (denoting the variety A). The value "0.93" from calculation of the expression (5) is substituted into the entry on row 2, column 7 (indicating the variety B).

What has been discussed above are the typical condition serving as the basis for determination in step S15 regarding the attribute "variety (A, B)" and the typical technique of calculating recommendation reason levels for the same attribute in step S16.

As described, the recommendation reason levels adopted as the item-specific recommendation reasons are written to the recommendation reason list 22. That is, the recommendation reason list is generated in step S19. This completes the process of calculating the recommendation reason level of each item in the example of FIG. 9.

Once step S2 in FIG. 6 (for calculating the recommendation reason level of each item) is completed, control is passed on to step S3 (for calculating a common recommendation reason). What takes place in step S3 will now be described by referring to FIGS. 12 through 15.

FIG. 12 is a flowchart of detailed steps constituting the process of calculating a common recommendation reason level, the process being carried out in step S3. In step S31 of FIG. 12, the common recommendation reason determining device 5 establishes one of the items in the recommendation reason list as the item of interest.

It is assumed here that the above-mentioned recommendation list 22 of FIG. 11 is utilized for the process. In this case, one of the first, the third, and the fifth items is established as the item of interest. For this example, the first item is assumed to be established as the item of interest.

In step S32, the common recommendation reason determining device 5 acquires from the recommendation list the recommendation reason level for each of the attributes of the item of interest. For any attribute of which the recommendation reason level is not found in the list, the value "0" is substituted (i.e., zero is acquired in step S32).

In step S33, the common recommendation reason determining device 5 selects one of all attributes.

In step S34, the common recommendation reason determining device 5 updates the common recommendation reason level α for the selected attribute. That is, the common recommendation reason determining device 5 in step S34 adds the recommendation reason level β of the item of interest to the preceding common recommendation reason level α. The resulting sum (−α+β) is then taken as the current common recommendation reason level α.

In step S35, the common recommendation reason determining device 5 checks to determine whether the common recommendation reasons for all attributes of the item of interest have been updated.

If in step S35 the common recommendation reasons for all attributes of the item of interest are not found to be updated yet, control is returned to step S33 and the subsequent steps are repeated. That is, a loop made up of steps S33 through 935 is executed repeatedly, whereby the common recommendation reason for each of the attributes is updated successively.

When the common recommendation reasons for all attributes of the item of interest are found to have been updated in step S35, control is passed on to step S36.

In step S36, the common recommendation reason determining device 5 checks to determine whether all items included in the recommendation list have each been established as the item of interest.

If in step S36 not all items in the recommendation list are found to be established as the item of interest, control is returned to step S31 and the subsequent steps are repeated. In this example, a loop formed by steps S31 through S36 is carried out repeatedly, whereby each of the third and the fifth items is established successively as the item of interest. The common recommendation reason for each of the attributes "color (red)," "color (white)," "variety (A)," and "variety (B)" is then updated successively for the third and the fifth items.

In terms of the attributes involved, the loop of steps S31 through S36 constitutes a process of calculating the sum total of the recommendation reason levels for each attribute of each recommended item. When steps S31 through S36 are repeated in a loop, the sum totals of the recommendation reason levels for all recommended items are determined eventually as the ultimate common recommendation reason levels.

When the ultimate common recommendation reasons are determined as described above, the result of the check in step S36 becomes affirmative ("YES"). Control is then transferred to step S37.

In step S37, the common recommendation reason determining device 5 selects the attribute whose common recommendation reason level is the highest as the theme for all recommended items (i.e., common recommendation reason).

Illustratively, the loop of steps S31 through S36 is executed repeatedly using the recommendation reason list 22 of FIG. 11. The execution of the steps provides a vector 23, shown in FIG. 13, made up of the components with their values representing the common recommendation reason levels (sum totals) for the attributes "1 (aroma)," "2 (aroma)," "3 (aroma)," "color (red)," "color (white)," "variety (A)," and "variety (B)." More specifically, the common recommendation reason level (sum total) is 0.5 for the attribute "1 (aroma)," 1.5 for "2 (aroma)," 1.5 for "3 (aroma)," 0 for "color (red)," 1 for "color (white)," 1.7 for "variety (A)," and 0.93 for "variety (B)."

Figure 13:
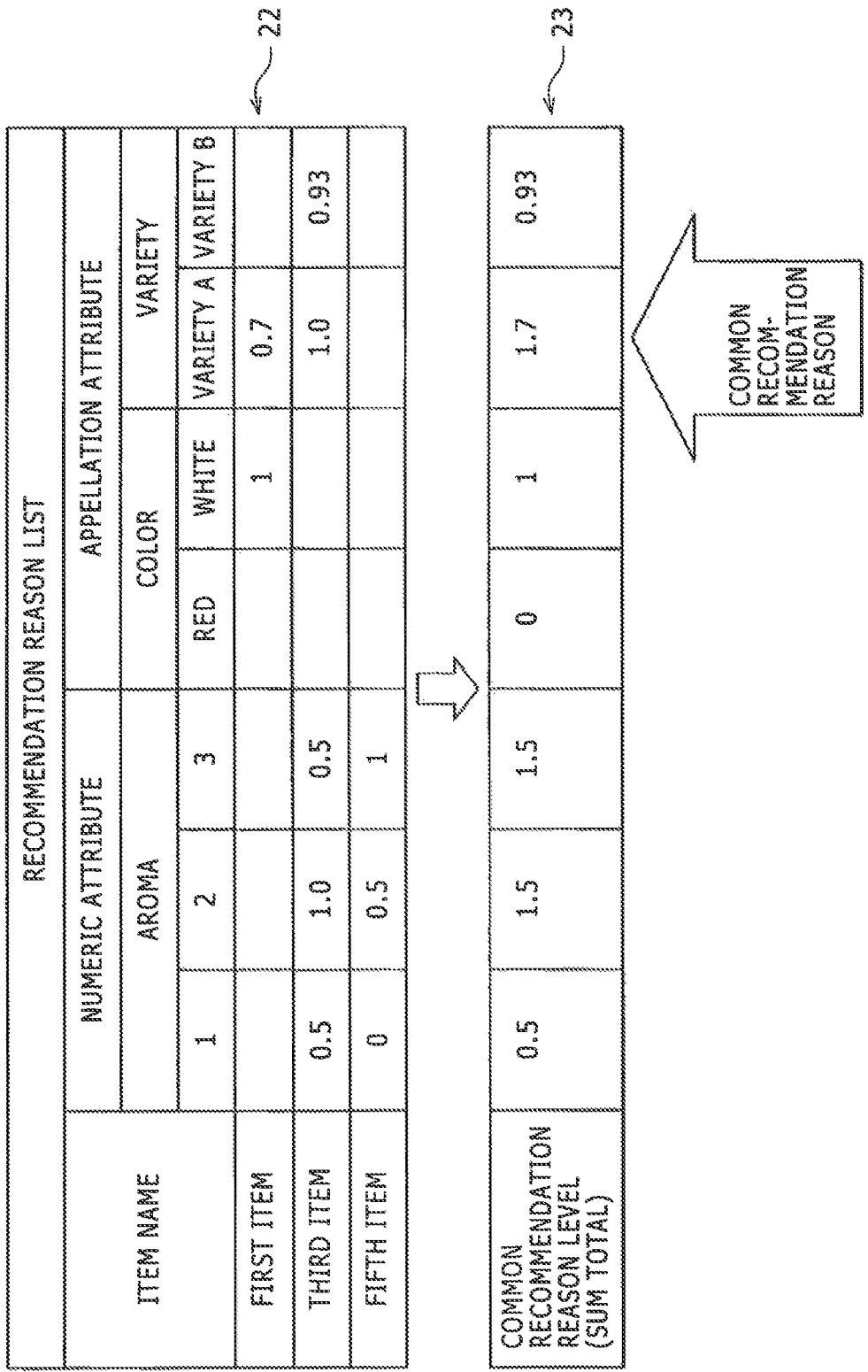
FIG. 13 is a tabular view showing how a common recommendation reason is determined by execution of the process in FIG. 12 using the recommendation reason list of FIG. 11.

The common recommendation reason level (sum total) for the attribute "variety (A)" is 1.7, the highest of all the levels. Thus the attribute "variety (A)" is determined as the theme for all recommended items (common recommendation reason) in step S37, as indicated in FIG. 13.

When the common recommendation reason is determined as described above in step S37, the process in the example of FIG. 12 is brought to an end. That is, the process of calculating a common recommendation reason level in step S3 of FIG. 6 is terminated, and control is passed on to step S4.

What has been discussed above is the process of calculating a common recommendation reason level detailed in FIG. 12. The same process in step S3 of FIG. 6 is not limited to the example of FIG. 12; it may be implemented using diverse techniques. That is, the technique of determining the common recommendation reason is not limited to what is described in FIG. 12. Any one of different appropriate techniques may be adopted for the purpose.

In the example of FIG. 12, as discussed above, the technique of determining the common recommendation reason involves initially obtaining the sum total of the recommendation reason levels for each of all attributes. The sums are used unmodified as common recommendation reason levels. The attribute corresponding to the highest of the common recommendation reason levels is then selected as the common recommendation reason. With this technique, each of the attributes involved is assigned the same weight. In other words, it is assumed that each attribute has the same level of importance from the user's point of view.

In practice, however, different attributes may well have different levels of importance for different users. In recent years, some users have expressed their desire to have more importance attached to a particular attribute or attributes when items are recommended; others have wanted to get less importance assigned to a specific attribute or attributes.

These demands of the different users can be met illustratively by adopting the inventive technique of determining a common recommendation reason, as will be outlined below. The technique involves initially acquiring a sum total of the recommendation reason levels for each of all attributes. The sums of the recommendation reason levels for each attribute are individually weighted to reflect each user's preferred level of importance. The weighted sum totals are used as common recommendation-reason levels, and the attribute having the highest of the common recommendation reason levels is determined as the common recommendation reason.

More specifically, the technique proposed here may be carried out by the common recommendation reason determining device 15 as follows:

The common recommendation reason determining device 15 generates a vector made up of the components representing the sum totals of the recommendation levels for each of the attributes involved. This vector will be referred to as the sum total vector in the ensuing description. Illustratively, the above-mentioned vector 23 in FIG. 13 (also in FIG. 14) is generated as the sum total vector having (0.5, 1.5, 1.5, 0, 1, 1.7, 0.93) as its components.

Figure 14:
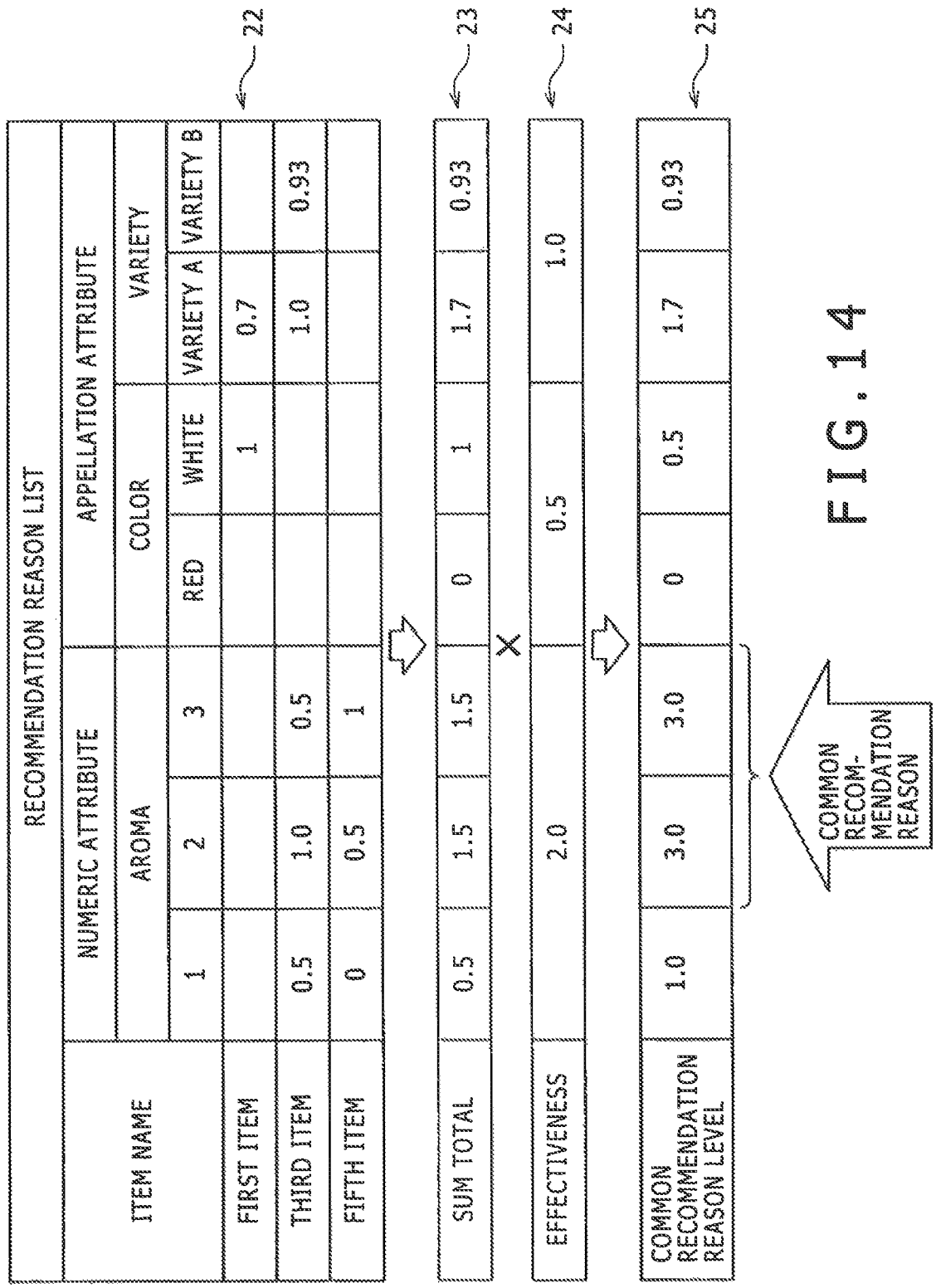
FIG. 14 is a tabular view showing how a common recommendation reason is determined by use of the same recommendation reason list of FIG. 11 except that a common recommendation reason determining technique different from the one applied to the example of FIG. 12 is adopted.

The common recommendation reason determining device 15 prepares in advance a vector with its component values suitably weighted to reflect each user's preferred level of importance regarding the attributes involved. This vector will be referred to as the effectiveness vector in the ensuing description. For example, a vector 24 shown in FIG. 14 is provided as an effectiveness vector. Although the vector 24 is indicated as a three-dimensional vector in FIG. 14, the vector in practice may be of the same type as the vector 23, i.e., a seven-dimensional vector having (2.0, 2.0, 2.0, 0.5, 0.5, 1.0, 1.0) as its components.

The common recommendation reason determining device 15 multiplies each of the values denoting the components of the sum total vector 23 by the value representing the corresponding component of the effectiveness vector 24. The product from multiplication of the values of each component is regarded as the common recommendation reason level for the corresponding attribute. A vector 25 shown in FIG. 14 is then generated using the common recommendation levels of the attributes involved as the component values (this vector will be referred to as the common recommendation reason level vector in the ensuing description). Whereas in the example of FIG. 13 the vector 23 itself is utilized as the common recommendation reason level vector, the vector 23 in FIG. 14 is employed merely as a sum total vector. As the common recommendation reason level vector, the vector 25 is adopted using (1.0, 3.0, 3.0, 0, 0.5, 1.7, 0.93) as its component values.

The common recommendation reason determining device 15 determines as the common recommendation reason the attribute that has the highest of the common recommendation reason levels, i.e., the attribute corresponding to the component having the largest value. More specifically, in the example of FIG. 14 the second and the third components in the common recommendation reason level vector 25 take the highest value of 3.0. The second and the third components of the vector 25 denote the attributes "2 (aroma)" and "3 (aroma)" respectively. Thus the attributes "2 (aroma)" and "3 (aroma)" are determined as the common recommendation reason. With the attribute "aroma" at level 3 (the larger the value, the stronger the aroma), the common recommendation reason is determined as a "robust aroma" (for wines) as indicated in the recommendation images of FIGS. 2 through 5.

As described, FIG. 14 serves to explain how the common recommendation reason is determined by use of a technique different from that of FIG. 13. The common recommendation reason determining technique is not limited to the examples of FIGS. 13 and 14. Other suitable techniques may be adopted instead.

For example, the vector 24 in FIG. 14 may be replaced as the effectiveness vector by a vector 26 in FIG. 15. FIG. 15 shows another example of the effectiveness vector with its components representing weighted values of the items involved.

Where the effectiveness vector 26 of FIG. 15 is adopted, the common recommendation reason determining technique is practiced as follows: before acquiring a sum total of the recommendation reason levels for each of the items, the common recommendation reason determining device 15 weights the recommendation reason level for each of the attributes regarding each of the items.

More specifically, given that the weighted value (component value) of the first item in the effectiveness vector 26 of FIG. 15 is 1.0, the recommendation reason level for each of the attributes of the first item is weighted by a factor of 1.0 (i.e., the recommendation reason levels are not updated).

In addition, given that the weighted value (component value) of the third item in the effectiveness vector 26 of FIG. 15 is 2.5, the recommendation reason level for each of the attributes of the third item is weighted by a factor of 2.5 (i.e., the recommendation reason levels are multiplied by 2.5 when updated).

Furthermore, given that the weighted value (component value) of the fifth item in the effectiveness vector 26 of FIG. 15 is 0.5, the recommendation reason level for each of the attributes of the fifth item is weighted by a factor of 0.5 (i.e., the recommendation reason levels are multiplied by 0.5 when updated).

In the manner described above, the common recommendation reason determining device 15 uses the effectiveness vector 26 to update the recommendation reason levels of the items included in the recommendation reason list.

Thereafter, the common recommendation reason determining device 15 carries out the above-described process of calculating the common recommendation reason level in FIG. 12 using the updated recommendation reason list.

The series of steps constituting the above process is executed by the common recommendation reason determining device 15. This is how another typical common recommendation reason determining technique is implemented by use of the effectiveness vector shown in FIG. 15.

The foregoing examples were shown to determine the common recommendation reason (theme) following determination of the recommended items. Alternatively, another technique of determining a common recommendation reason may be implemented as follows: the attribute preferred by a given user is established beforehand as a common recommendation reason on the basis of that user's history. Recommended items are then determined based on the predetermined common recommendation reason.

The alternative technique above corresponds to the common recommendation reason presenting process shown in the flowchart of FIG. 16. FIG. 16 with its flowchart outlines a process different from what was discussed earlier in reference to FIG. 6. The process of presenting the common reason for recommendation as outlined in FIG. 16 will now be described.

In step S51 of FIG. 16, based on the user's history or on other suitable information, the common recommendation reason determining device 5 in FIG. 1 establishes the attribute deemed important by the user as the theme (common recommendation reason) for all items.

It might happen that each of all attributes corresponding to all components of the item characteristic vector is established as the theme (common recommendation reason) in step S51. Which of the attributes is selected is dependent on the establishing technique in use. Diverse techniques of establishing the common recommendation reason may be adopted based not only on the user's history but also on other suitable information.

Illustratively, if the effectiveness vector such as the above-described vector 24 in FIG. 14 is provided in advance, a technique may be adopted whereby the attribute corresponding to the largest of the component values in the effectiveness vector is established as the theme.

The technique of determining the component values of the effectiveness vector (i.e., of determining effectiveness) is not limited in any way. For example, an effectiveness determining technique based on the user's history of item usages may be adopted. An alternative technique may involve adopting user-entered values as representative of effectiveness. Another technique may involve acquiring values from the calculation of user-entered values by a particular method and regarding the acquired values as representative of effectiveness. A further technique may determine effectiveness based on a particular algorithm such as the genetic algorithm. An even further technique may determine effectiveness on the basis of relationships between all users' histories of item usages on the one hand, and a particular user's history of item usages on the other hand. If the last technique is adopted, it is assumed that the items to be handled are wines and that the user in question tends to select a white whine while the majority of users are likely to choose red wines under a predetermined condition (e.g., a birthday for which a wine needs to be selected). On that assumption, the level of effectiveness for white wines is raised so as to reflect the user's preference for white wines.

Yet another technique may involve finding the largest of all values of the components that constitute a user preference vector in correspondence with appellation attributes and establishing as the theme the attribute represented by the component having the largest of the component values. This technique makes use of appellation attributes because they are often utilized as the attributes denoting user preferences.

Another technique may involve taking note of a plurality of items included in the user's history, acquiring the values representing the components that constitute the item characteristic vector of each of the items involved in correspondence with numeric attributes, finding the variance of the component values between the items, and establishing the attribute relative to the smallest variance as the theme. The items included in the user's history may be the items purchased by the user from item-offering (i.e., selling) sites on the Internet or the items of which the evaluation values have been input by the user. This technique establishes the numeric attribute relative to the smallest variance as the theme because numeric attributes generally denote the levels of any one of the characteristics of items. Given the attribute having the smallest variance, it may be said that the user has a consistent preference for the attribute in question (i.e., the user has purchased or appreciated the items with their levels close to one another).

Any one of the above-outlined techniques may be adopted and executed in step S51 of FIG. 16. The common recommendation reason determining device 5 establishes a common recommendation reason by carrying out the adopted technique. The common recommendation reason thus established is supplied to the recommendation list generating device 3 (arrow not shown in FIG. 1). Control is then passed on to step S52.

In step S52, the recommendation list generating device 3 acquires from the item characteristic vector storing device 2 at least one item characteristic vector (of each item) of which the attribute established as the theme (i.e., common recommendation reason) for all items has a component value satisfying a predetermined condition.

In step S53, the recommendation list generating device 3 calculates the level of similarity between the user preference vector in the user preference vector storing device 1 on the one hand, and the item characteristic vector or vectors acquired in step S52 on the other hand. The recommendation list generating device 3 determines as the recommended items each item corresponding to the item characteristic vector whose level of similarity satisfies a predetermined condition.

The recommendation list generating device 3 forwards the recommended items and the theme for all items (common recommendation reason) to the presenting device 6 (arrows not shown in FIG. 1). Control is then passed on to step S54.

In step S54, the presenting device 6 presents the recommended items to the user together with the theme for all items (common recommendation reason). This completes the common recommendation reason presenting process in the example of FIG. 16.

The series of steps and processes described above may be executed either by hardware or by software. In such cases, the recommendation system of FIG. 1 may be constituted illustratively by at least one personal computer such as the one shown in FIG. 17. The foregoing examples are practiced using the recommendation system of FIG. 1 formed by a single information processing apparatus. That is, one personal computer indicated in FIG. 17 may form the recommendation system of FIG. 1.

Figure 17:
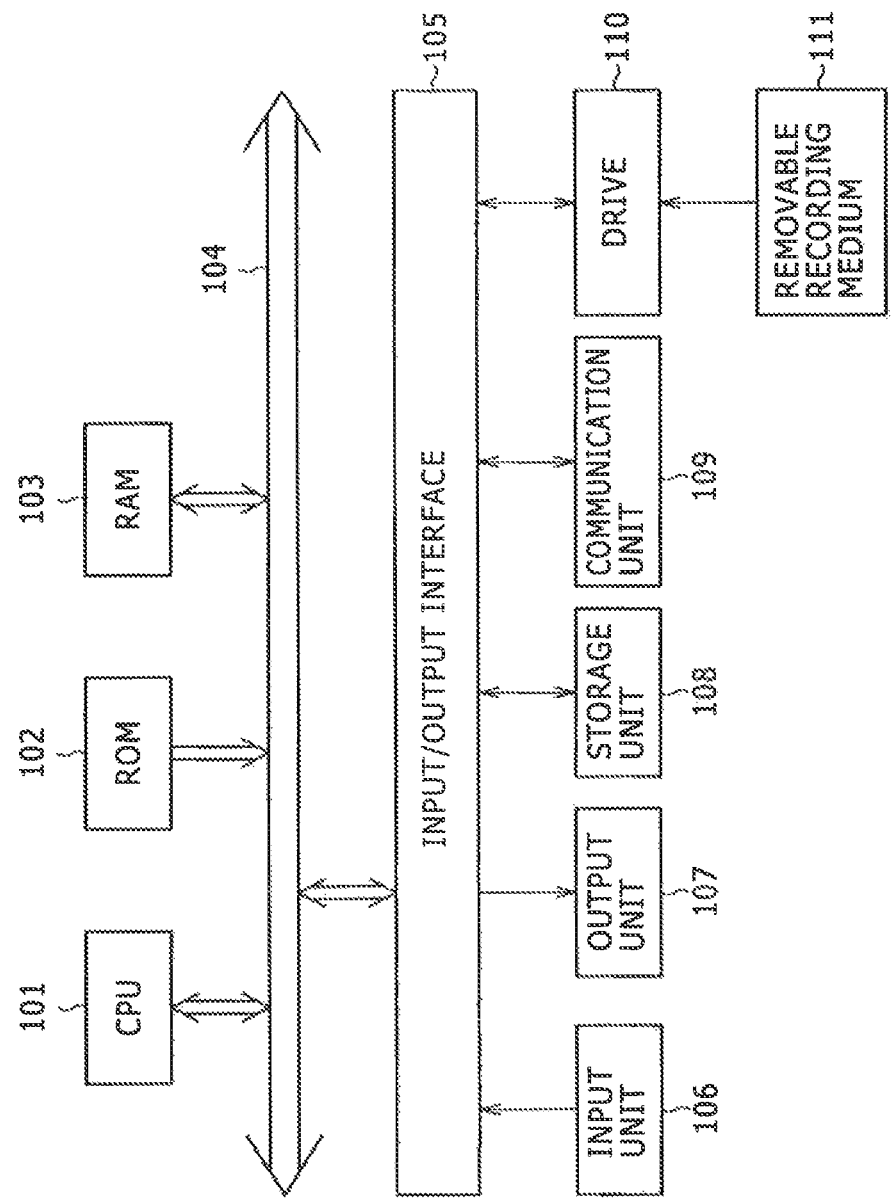
FIG. 17 is a block diagram showing a typical hardware structure of the information processing apparatus to which the present invention is applied.

In FIG. 17, a CPU (central processing unit) 101 performs diverse processes in accordance with programs held in a ROM (read only memory) 102 or in keeping with programs loaded from a storage unit 108 into a RAM (random access memory) 103. The RAM 103 also accommodates data that may be needed by the CPU 101 in carrying out its processes.

The CPU 101, ROM 102, and RAM 103 are interconnected by a bus 104. An input/output interface 105 is also connected to the bus 104.

The input/output interface 105 is connected to an input unit 106, an output unit 107, the storage unit 108, and a communication unit 109. The input unit 106 is constituted illustratively by a keyboard and a mouse; the output unit 107 by a display device; the storage unit 108 by a hard disk drive; and the communication unit 109 by a modem and/or a terminal adapter. The communication unit 109 controls communications with another apparatus (not shown) connected via a network such as the Internet.

A drive 110 is also connected as needed to the input/output interface 105. A removable recording medium 111 such as a magnetic disk, an optical disk, a magneto-optical disk, or a semiconductor memory is loaded as needed into the drive 110. Computer programs retrieved from the loaded recording medium are installed as needed into the storage unit 108.

The series of steps and processes described above may be executed by software. For the software-based processing to take place, the programs constituting the software may be either incorporated beforehand in dedicated hardware of a computer or installed upon use over a network or from a suitable recording medium into a general-purpose personal computer or like equipment capable of executing diverse functions based on the installed programs.

As shown in FIG. 17, the recording medium carrying the programs is offered to users not only as a package medium apart from the computer and constituted by the removable medium 111 such as a magnetic disk (including floppy disks), an optical disk (including CD-ROM (compact disk-read only memory) and DVD (digital versatile disc)), a magneto-optical disk (including MD (Mini-Disk)), or a semiconductor memory, each of the media carrying the necessary programs; but also in the form of the RON 102 or the hard disk drive contained in the storage unit 108, each unit accommodating the programs and incorporated beforehand in the computer.

In this specification, the steps which describe the programs to be executed and stored on the recording medium represent not only the processes that are to be carried out in the depicted sequence (i.e., on a time series basis) but also processes that may be performed parallelly or individually and not chronologically.

In this specification, the term "system" refers to an entire configuration made up of a plurality of component devices and/or processors.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus comprising:
at least one processor configured to
obtain user preference information and a plurality of content characteristic information; and
transmit display information to display a plurality of recommended contents including a television program or a content available on a network, a common recommendation reason for the plurality of recommended contents, and supplemental information for at least one of the plurality of recommended contents, wherein
the plurality of recommended contents is determined based on the user preference information and the plurality of content characteristic information,
the supplemental information includes content-specific textual information and a plurality of stars adjacent to the content-specific textual information, for said at least one of the plurality of recommended contents, the content-specific textual information including a name of said at least one of the plurality of recommend contents and additional textual information associated with said at least one of the plurality of recommended contents, and
the display information includes the additional textual information for only one of the plurality of recommended contents.

2. The information processing apparatus of claim 1, wherein the at least one processor is configured such that the display information further includes information to display a content-specific recommendation reason.

3. The information processing apparatus of claim 1, wherein the at least one processor is configured to generate at least one of the content characteristic information based on metadata associated with a corresponding content.

4. The information processing apparatus of claim 3, wherein the metadata comprises at least one of a title, an author, or a publisher of the corresponding content.

5. The information processing apparatus of claim 1, wherein the at least one processor is configured to generate the user preference information based on at least one of (i) a content previously purchased by a user or (ii) one or more elements of electronic content previously accessed by the user.

6. The information processing apparatus of claim 1, wherein the common recommendation reason comprises an identification of at least one of a content previously purchased by a user or a content previously accessed by the user.

7. The information processing apparatus of claim 1, wherein the at least one processor is configured to determine the plurality of recommended contents by
identifying a plurality of candidate reasons for identifying the plurality of recommended contents;
computing, for the plurality of recommended contents, metrics indicative of a relevance of the candidate reasons to the characteristic information; and
calculating sums of the metrics for the candidate reasons.

8. The information processing apparatus of claim 7, wherein the at least one processor is configured to identify a candidate reason of the candidate reasons associated with a maximum of the calculated sums as the common recommendation reason for identifying the plurality of recommended contents.

9. The information processing apparatus of claim 7, wherein the at least one processor is configured to establish a subset of the candidate reasons as reasons for identifying the plurality of recommended contents.

10. The information processing apparatus of claim 1, wherein the at least one processor is configured to determine at least one of the plurality of recommended contents based on an attribute common to the user preference information and the content characteristic information associated with the at least one of the plurality of recommended contents.

11. A method comprising:
obtaining, using at least one processor, user preference information and a plurality of content characteristic information; and
transmitting, using the at least one processor, display information to display a plurality of recommended contents including a television program or a content available on a network, a common recommendation reason for the plurality of recommended contents, and supplemental information for at least one of the plurality of recommended contents, wherein
the plurality of recommended contents is determined based on the user preference information and the plurality of content characteristic information,
the supplemental information includes content-specific textual information and a plurality of stars adjacent to the content-specific textual information, for said at least one of the plurality of recommended contents, the content-specific textual information including a name of said at least one of the plurality of recommend contents and additional textual information associated with said at least one of the plurality of recommended contents, and
the display information includes the additional textual information for only one of the plurality of recommended contents.

12. A non-transitory computer-readable medium storing instructions that, when executed by at least one processor, cause the at least one processor to perform a method, comprising:
obtaining user preference information and a plurality of content characteristic information; and
transmitting display information to display a plurality of recommended contents including a television program or a content available on a network, a common recommendation reason for the plurality of recommended contents, and supplemental information for at least one of the plurality of recommended contents, wherein
the plurality of recommended contents is determined based on the user preference information and the plurality of content characteristic information,
the supplemental information includes content-specific textual information and a plurality of stars adjacent to the content-specific textual information, for said at least one of the plurality of recommended contents, the content-specific textual information including a name of said at least one of the plurality of recommend contents and additional textual information associated with said at least one of the plurality of recommended contents, and the display information includes the additional textual information for only one of the plurality of recommended contents.

13. The information processing apparatus of claim 1, wherein the at least one processor is configured to output the display information to a display device.

14. The information processing apparatus of claim 1, wherein the content-specific information comprises information about a level of similarity with regard to the user preference information.

\* \* \* \* \*